(12) United States Patent
Fridman et al.

(10) Patent No.: US 7,720,082 B2
(45) Date of Patent: May 18, 2010

(54) SYSTEM AND METHOD FOR SHORT MESSAGE SERVICE AND INSTANT MESSAGING CONTINUITY

(75) Inventors: Sharon Fridman, London (GB); Ben Volach, Sterling, VA (US); Ran Makavy, Sterling, VA (US); I-Hsiang Yu, Falls Church, VA (US); Brian Rosen, Mars, PA (US); Thomas Chambers Ely, Bridgewater, NJ (US)

(73) Assignee: Neustar, Inc., Sterling, VA (US)

( * ) Notice: Subject to any disclaimer, the term of this patent is extended or adjusted under 35 U.S.C. 154(b) by 225 days.

(21) Appl. No.: 11/778,006

(22) Filed: Jul. 13, 2007

(65) Prior Publication Data
US 2008/0130663 A1  Jun. 5, 2008

Related U.S. Application Data

(60) Provisional application No. 60/830,351, filed on Jul. 13, 2006.

(51) Int. Cl.
*H04L 12/28* (2006.01)
(52) U.S. Cl. ...................... 370/401; 370/412
(58) Field of Classification Search ................ 370/401, 370/412
See application file for complete search history.

(56) References Cited

U.S. PATENT DOCUMENTS

| | | | |
|---|---|---|---|
| 6,098,098 A | 8/2000 | Sandahl et al. | |
| 6,411,615 B1 | 6/2002 | Degolia, Jr. et al. | |
| 2003/0083078 A1 | 5/2003 | Allison et al. | |
| 2004/0058694 A1* | 3/2004 | Mendiola et al. | 455/466 |
| 2004/0199649 A1 | 10/2004 | Tarnanen et al. | |
| 2005/0027805 A1* | 2/2005 | Aoki | 709/206 |
| 2005/0185634 A1* | 8/2005 | Benco et al. | 370/352 |
| 2006/0068762 A1* | 3/2006 | Baldwin et al. | 455/412.1 |
| 2006/0123078 A1* | 6/2006 | Mendiola et al. | 709/203 |
| 2006/0198334 A1* | 9/2006 | Civanlar et al. | 370/328 |
| 2006/0258394 A1* | 11/2006 | Dhillon et al. | 455/552.1 |
| 2006/0271696 A1* | 11/2006 | Chen et al. | 709/229 |
| 2007/0055995 A1* | 3/2007 | Jiang | 725/62 |
| 2007/0184860 A1* | 8/2007 | Jansson | 455/466 |
| 2007/0243891 A1* | 10/2007 | Civanlar et al. | 455/466 |
| 2009/0019367 A1* | 1/2009 | Cavagnari et al. | 715/716 |

OTHER PUBLICATIONS

International Search Report and Written Opinion received in the corresponding International Application No. PCT/US2007/073544.

* cited by examiner

*Primary Examiner*—Andrew Lee

(57) ABSTRACT

A system and method are disclosed for communicating messages between users that use different messaging services. A message from a user communication device is communicated to a remote user communication device using a first messaging service. The remote user communication device communicates messages using a second messaging service. The message from the user communication device is routed to a messaging interface gateway in accordance with configuration information associated with the remote user communication device. The message is routed from the messaging interface gateway to a messaging server associated with the remote user communication device. The messaging server is configured to use the second messaging service. The message is delivered to the remote user communication device using the second messaging service.

33 Claims, 16 Drawing Sheets

SYSTEM AND METHOD FOR SHORT MESSAGE SERVICE AND INSTANT MESSAGING CONTINUITY

The present application claims priority under 35 U.S.C. §119(e) to U.S. Provisional Application No. 60/830,351, filed on Jul. 13, 2006, the entire contents of which are hereby incorporated by reference herein.

BACKGROUND

1. Field of the Invention

The present invention relates to messaging systems. More particularly, the present invention relates to a system and method for short message service and instant messaging continuity.

2. Background Information

Instant Messaging (IM) mobile solutions can enhance conventional Short Message Service (SMS), allowing message delivery based on availability and willingness to communicate. In particular, Mobile Instant Messaging (MIM) can enhance SMS through the use of suitable Internet Protocol (IP) technology and presence information. The mobile market includes SMS and IM clients, and SMS Centers (SMSCs) and IM Enablers to service the SMS and IM clients, respectively. Such systems are described in, for example: European Telecommunications Standards Institute (ETSI) Global System for Mobile Communications (GSM) Technical Specification, "Digital Cellular Telecommunications System (Phase 2+); Technical Realization of Short Message Service (SMS) Point-to-Point (PP)," GSM 03.40, Version 5.3.0 (July 1996); Telecommunication Standardization Section of International Telecommunication Union (ITU-T) Recommendation E. 164, "The International Public Telecommunication Numbering Plan" (February 2005); ITU-T Recommendation E.212, "The International Identification Plan for Mobile Terminals and Mobile Users" (May 2004); Internet Engineering Task Force (IETF), Network Working Group, Request for Comments (RFC) 2778, "A Model for Presence and Instant Messaging" (February 2000); IETF, Network Working Group, RFC 2779, "Instant Messaging/Presence Protocol Requirements" (February 2000); and Open Mobile Alliance, Instant Messaging and Presence Service (IMPS) V1.3 (January 2007) (also known as "Wireless Village"). However, full SMS-IM interoperability, within a domain, across domains, and from SMS-Only to IM-enabled operators is not currently available.

Conventional SMS technology allows a SMS client to send messages to other SMS clients via the SMSC. The SMS clients can be of the same Mobile Network Operator (MNO), different MNO, or can be roaming. FIG. 1 is a block diagram illustrating a basic architecture 100 of a SMS-Only network. As illustrated in FIG. 1, a first mobile SMS device 105 is associated with a first MNO $C_1$, and a second mobile SMS device 115 is associated with a second MNO $C_2$. The first mobile SMS device 105 sends a SMS message to the local SMSC 110 in MNO $C_1$. The local SMSC 110 is configured to query the network (e.g., a destination Home Location Register (HLR) in the mobile network) to route the SMS message properly to the destination network and the second mobile SMS device 115. It is noted that the target MNO SMSC or other messaging servers are not included in the delivery path, and thus the second mobile SMS device 115 will only receive SMS messages. The present example is illustrative of what can occur in GSM (Global System for Mobile communication) mobile networks, and similar or additional like scenarios can occur in CDMA (Code Division Multiple Access) mobile networks.

In addition, SMSCs can support short codes or large accounts that are specific addresses for allowing routing to applications or services rather than a terminating device. SMSC short codes allow SMS clients to send messages to IM clients by configuring the SMSC with the address of the IM enabler that is allocated to a set of short codes. The SMS client can then originate messages or reply to those short codes. The short codes are translated by the IM enabler to the destination IM client, rather than being delivered as SMS.

Short codes are allocated by the IM Enabler, and maintained in a reply list within the IM Enabler. For example, a reply list for User A can contain the address of User B (e.g., a Mobile Station International Subscriber Directory Number (MSISDN)) and a reusable short code that User A can use to reply to messages from User B. User A can also initiate messages to the given short code. However, such a model does not allow inter-operator messaging, and the short code is not a native address for mobile communications. It is noted that short codes are not generally used by users to indicate their "friends" and "acquaintances," unlike MSISDN which is commonly part of a conventional mobile phone address book (e.g., a list of friends and their MSISDNs).

Some enhancements have been made to the aforementioned model that allow cross-operator reply from SMS to IM. In particular, as described in, for example, U.S. Pat. No. 6,085,100, SMSC gateway applications can be introduced that allow the SMS device to reply via the SMSC from which the message was sent, not via the home-domain-configured SMSC. However, such enhancements are limited (e.g., to SMS replies only, and not allowing initiation).

SUMMARY OF THE INVENTION

A system and method are disclosed for short message service and instant messaging continuity. In accordance with exemplary embodiments of the present invention, according to a first aspect of the present invention, a system for communicating information between users that use different messaging services includes a first user communication module. The first user communication module is configured to communicate a message to a second user communication module using a first messaging service. The second user communication module is configured to communicate messages using a second messaging service. The system includes a signaling gateway module in communication with the first user communication module. The signaling gateway module is configured to interface messages between the first messaging service and the second messaging service. The message from the first user communication module is routed to the signaling gateway module in accordance with configuration information associated with the second user communication module. The signaling gateway module is configured to route the message to the second user communication module via a messaging server module configured to use the second messaging service.

According to the first aspect, the system can include a communication server module in communication between the first user communication module and the signaling gateway module. The communication server module can be configured to communicate with the first user communication module using the first messaging service. The communication server module can comprise a Short Message Service Center (SMSC) module or the like. The system can include a user information database module in communication with the communication server module. The user information database module can be configured to store the configuration information of the first and second user communication modules. For example, the configuration information of the second user communication module can comprise a Mobile Station International Subscriber Directory Number (MSISDN). The communication server module can be configured to obtain the configuration information associated with the second user communication module from the user information database module for routing the message to the signaling gateway module. The signaling gateway module can be configured to modify the configuration information of the second user communication module stored in the user information database module so that messages between the first user communication module and the second user communication module are routed through the signaling gateway module. For example, the user information database module can comprise a Home Location Register (HLR) module. The signaling gateway module can comprise a message filter module. The message filter module can be configured to allow routing through the signaling gateway module of messages communicated from the first user communication module using the first messaging service. The message filter module can also be configured to block non-message-related information communicated from the first user communication module using the first messaging service. The message filter module can be further configured to return the non-message-related information to the first user communication module.

According to the first aspect, the system can include a user information database proxy module. The user information database proxy module can be configured to prevent the returned non-message-related information from being routed back to the signaling gateway module. For example, the user information database proxy module can comprise a HLR proxy module or the like. The first user communication module can be associated with at least two addresses. On one of the at least two addresses can be adapted for use in returning the non-message related information to the first user communication module. According to an exemplary embodiment of the first aspect, the first user communication module can comprise a SMS communication device, the signaling gateway module can comprise a SS7 application module, the second user communication module can comprise an IM communication device, the messaging server module can comprise an Instant Messaging (IM) enabler module, the first messaging service can comprise SMS, and the second messaging service can comprise IM.

According to a second aspect of the present invention, a system for communicating information between users includes a first mobile network operator in communication with a first communication device. The first communication device is configured to communicate a message to a second communication device using a first messaging service. The second communication device is configured to communicate messages using a second messaging service. The system includes a second mobile network operator in communication with the first mobile network operator and the second communication device. The second mobile network operator comprises a messaging interface module. The messaging interface module is configured to interface messages between the first messaging service and the second messaging service. The second mobile network operator comprises a messaging server module in communication with the messaging interface module and the second communication device. The messaging server module is configured to use the second messaging service for communicating messages to the second communication device. The first mobile network operator is configured to route the message from the first communication device to the messaging interface module in accordance with address information associated with the second communication device. The messaging interface module is configured to route the message to the messaging server module. The messaging server module is configured to deliver the message to the second communication device using the second messaging service.

According to the second aspect, the system can include a HLR in communication with at least the first mobile network operator. The HLR can be configured to store the address information of at least the second communication device. For example, the address information of the second communication device can comprise a MSISDN. The first mobile network operator module can be configured to obtain the address information associated with the second communication device from the HLR for routing the message to the messaging interface module. The messaging interface module can be configured to modify the address information of the second communication device stored in the HLR so that messages between the first and second communication devices are routed through the messaging interface module. The second mobile network operator can comprise a filter module in communication with the messaging interface module. The filter module can be configured to allow routing through the messaging interface module of messages communicated from the first communication device using the first messaging service. The filter module can be configured to block non-message-related information communicated from the first communication device using the first messaging service. The filter module can be configured to return the non-message-related information to the first communication device. The system can include a HLR proxy in communication with at least the first mobile network operator. The HLR proxy is configured to prevent the returned non-message-related information from being routed back to the messaging interface module.

According to the second aspect, the first communication device is associated with at least two addresses. One of the at least two addresses is adapted for use in returning the non-message related information to the first communication device. According to an exemplary embodiment of the second aspect, the first messaging service can comprise SMS, the first communication device can comprise a SMS device, the first mobile network operator can comprise a Short Message Service Center (SMSC), the messaging interface module can comprise a SS7 application module, the second messaging service can comprise IM, the second communication device can comprise an IM device, and the messaging server module can comprise an IM enabler module.

According to a third aspect of the present invention, a computer-readable medium contains an addressing data structure for use in routing a message from a first user having a first messaging service to a second user having a second messaging service. The addressing data structure includes a header data structure and an account data structure. The account data structure comprises an account prefix designation. The addressing data structure includes a suffix data structure. The suffix data structure comprises an index data structure. The index data structure comprises an index pointer within a reply list for replying to an originator of the message. The suffix data structure includes an address suffix structure. The address suffix structure comprises an address configured to allow the recipient to uniquely determine the originator of the message.

According to the third aspect, the account prefix designation of the account data structure can comprise a large account code. According to an exemplary embodiment of the third aspect, the message can comprise a SMS message, and the account prefix designation of the account data structure can be configured to cause the SMS message associated with the address data structure to be routed from a SMSC to an IM Enabler. The address of the address suffix structure can comprise a MSISDN of the originator of the message. The address of the address suffix structure can comprise a unique identifier for identifying the originator of the message. For example, the first messaging service can comprise SMS, and the second messaging service can comprise IM. The addressing data structure can be formed in accordance with ITU-T E.164 and ITU-T E.212.

According to a fourth aspect of the present invention, a method of communicating messages between users that use different messaging services includes the steps of: communicating a message from a first user communication device to a second user communication device using a first messaging service, wherein the second user communication device communicates messages using a second messaging service; routing the message from the first user communication device to a messaging interface gateway in accordance with configuration information associated with the second user communication device; routing the message from the messaging interface gateway to a messaging server associated with the second user communication device, wherein the messaging server is configured to use the second messaging service; and delivering the message to the second user communication device using the second messaging service.

According to the fourth aspect, the method can include the step of: storing the configuration information of at least the second user communication device. For example, the configuration information of the second user communication device can comprise a MSISDN. The method can one or more of the steps of: retrieving the stored configuration information associated with the second user communication device for routing the message to the messaging interface gateway; modifying the stored configuration information of the second user communication device so that messages between the first user communication device and the second user communication device are routed through the messaging interface gateway; filtering messages routed through the messaging interface gateway that are communicated from the first user communication device using the first messaging service; blocking non-message-related information communicated from the first user communication device using the first messaging service; returning the non-message-related information to the first user communication device; and preventing the returned non-message-related information from being routed back to the messaging interface gateway. The first user communication device can be associated with at least two addresses. One of the at least two addresses can be adapted for use in returning the non-message related information to the first user communication device.

According to an exemplary embodiment of the fourth aspect, the first user communication device can comprise a SMS communication device, the messaging interface gateway can comprise a SS7 application, the second user communication device can comprise an IM communication device, the messaging server can comprise an IM Enabler, the first messaging service can comprise SMS, and the second messaging service can comprise IM.

According to a fifth aspect of the present invention, a method of communicating information between users includes the steps of: communicating a SMS message from a SMS client to an IM client at a MSISDN address; obtaining routing information for the IM client from a HLR by a SMSC in communication with the SMS client; routing the SMS message from the SMS client to a SS7 gateway by the SMSC in accordance with the routing information; forwarding the SMS message by the SS7 gateway to an IM enabler in communication with the IM client; and delivering an IM message associated with the SMS message to the IM client by the IM enabler. The SS7 gateway is configured to modify the routing information of the IM client stored in the HLR so that messages between the SMS client and the IM client are routed through the SS7 gateway.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for Short Message Service (SMS) and Instant Messaging (IM) continuity. The system and method according to exemplary embodiments allow SMS clients based on SMSC servers and IM clients using IM Enablers (or other suitable messaging clients and services) to seamlessly exchange messages bi-directionally for both initiating and replying to such messages. The present invention supports all communication scenarios involving IM-Enabled MNOs, including intra-IM-Enabled operators, cross-IM-Enabled operators, and cross IM-Enabled and SMS-Only operators. Exemplary embodiments can include an IM Enabler that supports bi-directional SMS continuity. Existing SMSCs can be configured to reach local IM Enablers for specific address spaces. According to an alternative exemplary embodiment, a "smart" addressing structure can be used in routing the messages. Exemplary embodiments do not require changes to existing SMS clients, SMSCs, standard IM clients, or other like messaging clients and services.

Thus, SMS users can initiate messages to and reply to messages from destinations that can be either SMS or IM (or other like messaging service). For example, IM users can have the advantages of a presence-enabled IM Enabler (e.g., privacy, authorization, preferences, offline messaging policy, blocking, and the like) even for SMS users in the IM user's domain or remote domains. SMS users can natively use mobile addressing in their address book (e.g., GSM MSISDN or the like) to route messages to a destination that can be SMS or IM (or other like messaging service). Mobile devices can show or otherwise display the incoming message with the address book record of the sender (e.g., if the sender appears in the device address book). In addition, a sender need not reveal its MSISDN to the destination, and the recipient SMS-Only user can still reply to that sender. Thus, exemplary embodiments of the present invention can allow for the interoperation of IM Enabled operators, as well as SMS-Only and IM-Enabled operators, and other like messaging services.

Figure 1:
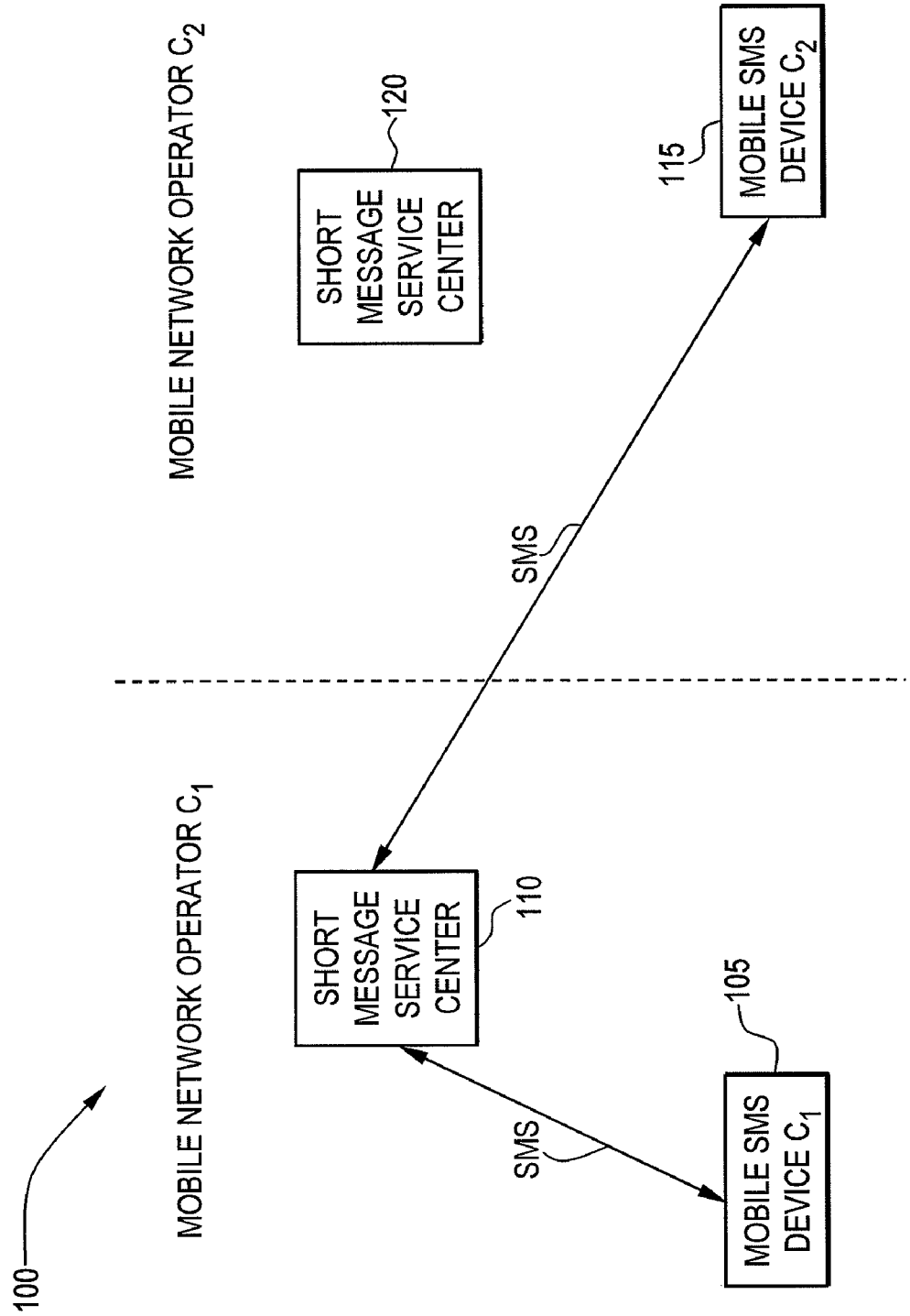
FIG. 1 is a block diagram illustrating a basic architecture of a SMS-Only network.
Figure 2:
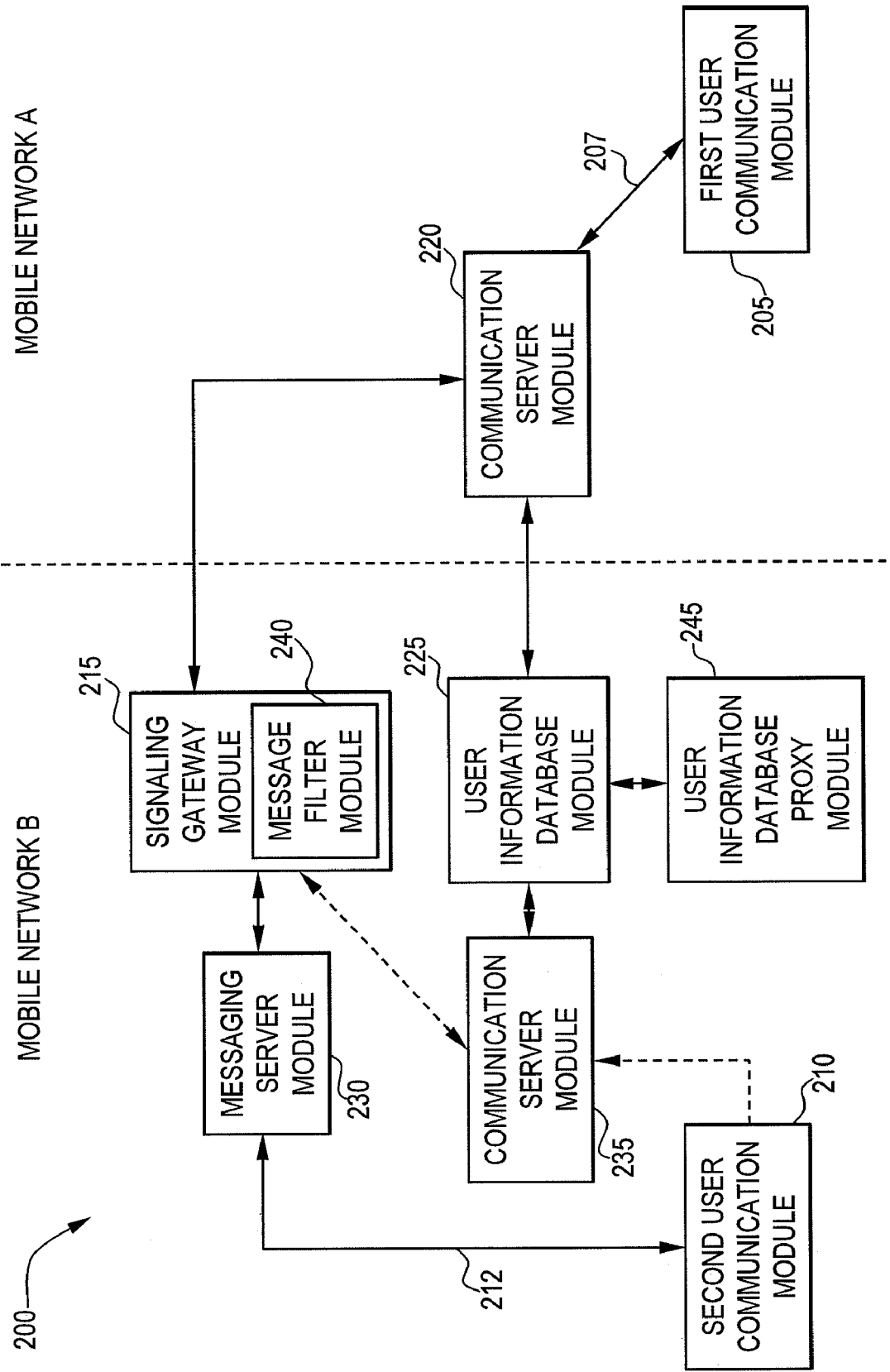
FIG. 2 is a diagram illustrating a system for communicating information between users that use different messaging services, in accordance with an exemplary embodiment of the present invention.

These and other aspects and embodiments of the present invention will now be described in greater detail. FIG. 2 is a diagram illustrating a system 200 for communicating information between users that use different messaging services, in accordance with an exemplary embodiment of the present invention. The system 200 includes a first user communication module 205. The first user communication module 205 is associated with a first network, such as, for example, mobile network A. The first user communication module 205 is configured to communicate a message to a second user communication module 210 using a first messaging service 207. The second user communication module 210 is associated with a second network, such as, for example, mobile network B. The second user communication module 210 is configured to communicate messages using a second messaging service 212. According to an exemplary embodiment, the first user communication module 205 can comprise a SMS communication device, and the first messaging service 207 can comprise SMS. The second user communication module 210 can comprise an IM communication device, and the second messaging service 212 can comprise IM. However, each of the first and second communication modules 205 and 210 can comprise any suitable type of mobile module or device that is capable of communicating messages or other information using any appropriate type of mobile messaging service.

Those of ordinary skill in the art will recognize that any suitable number of user communication modules (e.g., user communication module 1, user communication module 2, user communication module 3, . . . , user communication module N, where N is any appropriate number) can be used with the system 200 in accordance with exemplary embodiments of the present invention. In addition, mobile networks A and B can each comprise any suitable type of mobile communication network. For example, each of mobile networks A and B can be operated or otherwise managed by any appropriate type of Mobile Network Operator (MNO), mobile virtual network operator, wireless service provider, wireless carrier, mobile phone operator, or cellular company or organization. Skilled artisans will recognize that any suitable number (e.g., network 1, network 2, network 3, . . . , network M, where M is any appropriate number) and kinds (e.g., wired, wireless, or combination thereof) of networks can be used with system 200 in accordance with exemplary embodiments.

The system 200 includes a signaling gateway module 215 in communication with the first user communication module 205. The system includes a communication server module 220 in communication between the first user communication module 205 and the signaling gateway module 215. The communication server module 220 is configured to communicate with the first user communication module 205 using the first messaging service 207. According to an exemplary embodiment, the communication server module 220 can comprise a Short Message Service Center (SMSC) or the like. However, the communication server module 220 can be any suitable type of server module that is capable of communicating with the first user communication module 205 via the first messaging service 207 for routing messages and other information to and from the first user communication module 205.

The signaling gateway module 215 is configured to interface messages between the first messaging service 207 and the second messaging service 212. According to an exemplary embodiment, the signaling gateway module 215 can comprise a Signaling System #7 (SS7) application module, such as the OpenCall SS7 signaling platform available from the Hewlett-Packard Company (Palo Alto, Calif.). However, the signaling gateway module 215 can be comprised of any suitable type of telephony signaling protocol application module that is capable of exchanging or otherwise interfacing information between the first user communication module 205 (using the first messaging service 207) and the second user communication module 210 (using the second messaging service 212).

The message from the first user communication module 205 can be routed (via the communication server module 220) to the signaling gateway module 215 in accordance with configuration information associated with the second user communication module 210. The system 200 includes a user information database module 225 in communication with the communication server module 220. The user information database module 225 is configured to store the configuration information of at least the first and second user communication modules 205 and 210. According to an exemplary embodiment, the user information database module 225 can comprise a Home Location Register (HLR), although the user information database module 225 can comprise any suitable type of database or repository of subscriber information for a mobile network. The configuration information of the second user communication module 210 can comprise, for example, a Mobile Station International Subscriber Directory Number (MSISDN). However, the configuration information of the first and second communication modules 205 and 210 can comprise any suitable type of address or other unique routing information that can be used for directing messages to the respective communication module.

The communication server module 220 is configured to obtain the configuration information associated with the second user communication module 210 from the user information database module 225 for routing the message to the signaling gateway module 215. According to exemplary embodiments, the signaling gateway module 215 can be configured to modify the configuration information of the second user communication module 210 stored in the user information database module 225 so that messages between the first user communication module 205 and the second user communication module 210 are routed through the signaling gateway module 215. In other words, the signaling gateway module 215 can configure the user information database module 225 so that messages to the second user communication module 210 are addressed to the signaling gateway module 215. Accordingly, the signaling gateway module 215 is configured to route the message (from the first user communication module 205) to the second user communication module 215 via a messaging server module 230 that is configured to use the second messaging service 212. For example, the messaging server module 230 can comprise an IM Service Center (IMSC) (available from NeuStar, Inc., Sterling, Va.), such as an IM Enabler module or the like. However, the messaging server module 230 can be any suitable type of server module that is capable of communicating with the second user communication module 210 via the second messaging service 212 for routing messages and other information to and from the second user communication module 210.

Figure 3:
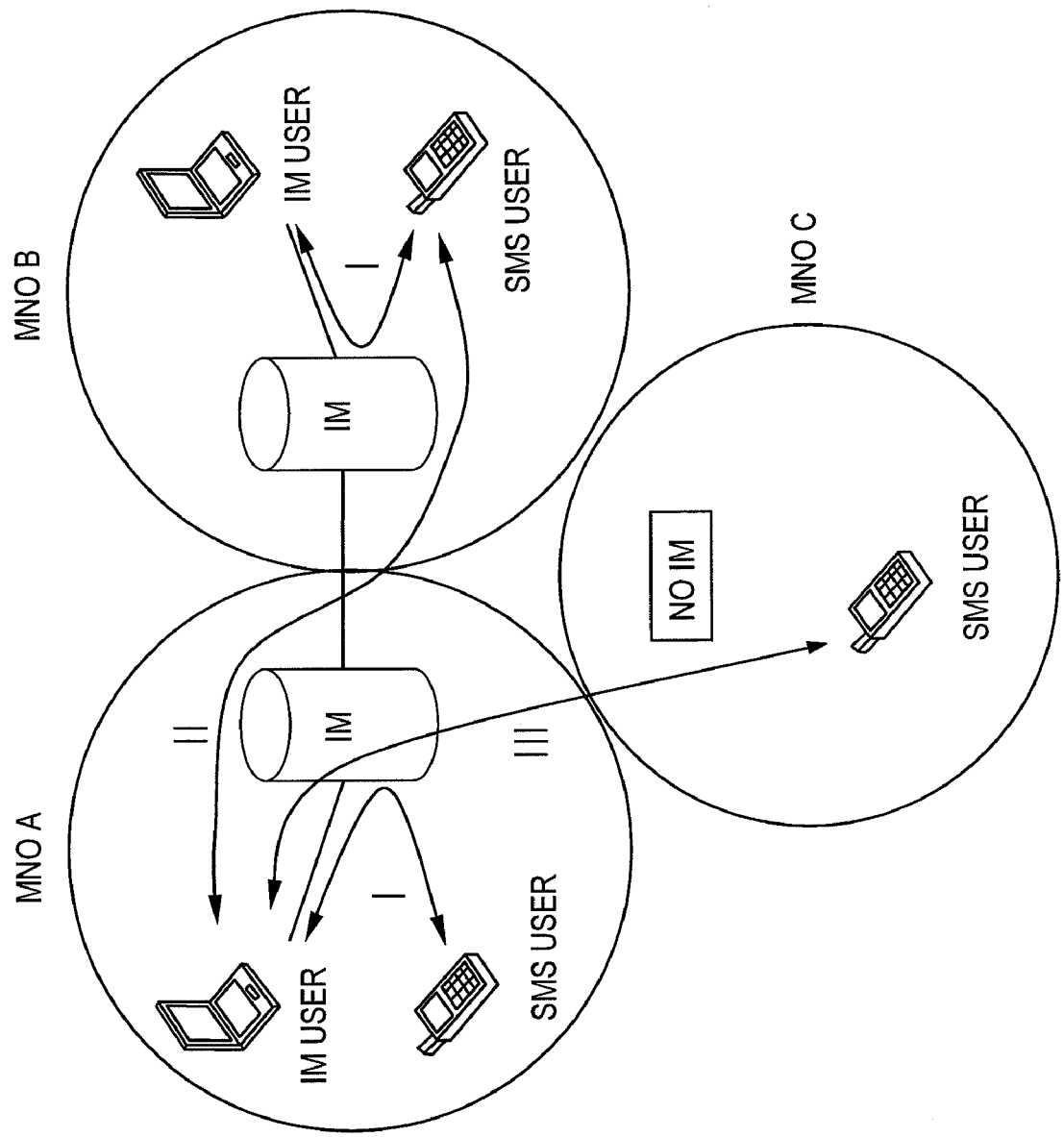
FIG. 3 is diagram illustrating the use cases supported in accordance with exemplary embodiments of the present invention.

Thus, the system 200 can route a message from the first user communication module 205 using the first messaging service 207 to the second user communication module 210 using the second messaging service 212. A similar (but reversed) methodology can be used to route a message from the second communication module 210 using the second messaging service 212 to the first communication module 205 using the first messaging service 207. In such a manner, exemplary embodiments of the present invention provide users running different messaging services with the ability to seamlessly exchange messages bi-directionally for both initiating and replying to such messages. For example, if the second user communication module 210 uses SMS for communicating messages, then a SMS message can be passed to the communication server module 235 (e.g., functioning as a SMSC) for routing to the signaling gateway module 215. The signaling gateway module 215 can then route the message to the communication server module 220 (e.g., functioning as an IM Enabler) to pass an instant message to the first user communication module 205 that is using IM for communicating messages. FIG. 3 is a diagram illustrating the use cases supported by the present invention. As noted previously, exemplary embodiments of the present invention support all scenarios involving IM-Enabled MNOs, including intra-IM-Enabled operators (use case I), cross-IM-Enabled operators (use case II), and cross IM-Enabled and SMS-Only operators (use case III).

Merely for purposes of illustration and not limitation, an example of an implementation of an exemplary embodiment of the present invention will be described. In the present illustration, the first messaging service 207 can comprise SMS, the first user communication module 205 can comprise a mobile SMS device, the second messaging service 212 can comprise IM, the second user communication module 210 can comprise a mobile IM device, the signaling gateway module 215 can comprise a SS7 application, the communication service module 220 can comprise a SMSC, the user information database module 225 can comprise a HLR, and the messaging server module 230 can comprise an IM Enabler. In addition, the mobile network A can comprise a MNO A, and the mobile network B can comprise a MNO B. According to the present illustration, the mobile IM and SMS continuity can be achieved by enhancing the IM Enabler with a SMS application. No other change to either MNO A or B is needed.

In the present illustration, the SMS User A in MNO A (first user communication module 205) sends a SMS message to the destination address (e.g., MSISDN) of the IM User B in MNO B (second user communication module 210). The local SMSC in MNO A (communication server module 220) routes the SMS message according to the configuration information in the HLR (user information database module 225) for IM User B. In other words, the SMSC consults the HLR for User B to determine the appropriate routing. The configuration information assigns the address of the SS7 application (signaling gateway module 215) in MNO B instead of a SMS client associated with User B (so that all SMS messages for IM User B go through the signaling gateway module 215). The address change can be specified by the MNO or other operator or system administrator (e.g., when setting up or updating the mobile network). Alternatively, the address change can be triggered by a suitable event, such as, for example, the provisioning of User B to an IM service at MNO B, at each login of User B to the mobile IM client, or other suitable event. For example, when the IM User B uses the IM client, the corresponding IM Enabler at MNO B can notify the SS7 application at MNO B. The SS7 application can configure the SS7 network (e.g., HLR) of User B to address the SS7 application at MNO B. Accordingly, the SMSC routes the SMS message to the SS7 application at MNO B. The SS7 application forwards the message to the destination IM Enabler in MNO B as configured. The IM Enabler in MNO B then sends the instant message to the IM client of User B rather than by SMS.

According to exemplary embodiments, the signaling gateway module 215, acting as a SS7 gateway, can provide an HLR proxy and virtual Messaging Service Center (MSC) functions to allow interception of SMS messages, and diversion as SMS to a virtual MSC rather than the termination user MSC. Then, a conversion function can use an appropriate IP-level protocol (e.g., the Short Message Peer-to-Peer protocol (SMPP) or the like) toward the IMSC to allow termination as IM, if necessary. The IMSC acts as the application server for the IM application—it is configured to route SMS through the SMPP interface (or other like protocol interface) to the operator's SMSC. In other words, the signaling gateway module 215 can be configured to intercept "non-network-generated" Short Messages (SMs) destined towards the online IM users, and deliver those messages in, for example, SMPP to the IMSC. It is noted that SMs may include textual or potentially IM-convertible messages, as well as "network SM" that should not be terminated as IM, regardless of the terminating user being IM provisioned. Such "network SM" can include, but are not limited to, ringtones, and other like information.

Accordingly, the signaling gateway module 215 can include a suitable MSC Proxy module. The MSC Proxy module can be configured to receive SMS messages that have been rerouted by an HLR Proxy module (discussed below), and convert those messages into IMs that are then sent to the IMSC (e.g., messaging server module 230). Optionally, the MSC Proxy module can be configured to handle non-textual SMs, filtering, and IM-to-SMS using the SMS type (discussed below). The system 200 can include a user information database proxy module 245 in communication with the user information database module 225. According to an exemplary embodiment, the user information database proxy module 245 can comprise a HLR Proxy module or the like that is in communication with the HLR (e.g., user information database module 225) and the communication server module 220. The HLR Proxy module is configured to intercept SRI_for_SM messages (a routing enquiry), query the IPI-ARM directory to determine if the messages are for an MSISDN that is registered for IM, and, if so, reroute the messages to the MSC Proxy module. The IPI-ARM (IP Interconnect Address Resolution for MSISDN) module is a directory or database service that is queried with the MSISDN and returns the IMSC and Presence Server associated with the MSISDN. Such a directory can contain the routing information that allows for IP applications to interact with a MSISDN. The IPI-ARM can be a shared directory where operators can provide access information for their subscribers. The information can then be available for qualified applications, and allow interoperable services. The IPI-ARM directory can enable the development of rich IP-based applications, as well as enabling the efficient routing of messages off the circuit switched SS7 network onto the much more efficient IP network.

According to exemplary embodiments, the system 200 can use the IPI-ARM directory to maintain basic operator information for unknown MSISDNs, to allow proper routing decisions, and for updating the directory with user's data. Thus, the IPI-ARM directory can contain a database of all registered mobile IM users. For those users who are not registered, the IPI-ARM directory is configured to determine the operator by querying the HLR, and can return the default IMSC and Presence server. The IPI-ARM directory can contain different policies, so that different systems can be exposed to internal or external networks. According to an exemplary embodiment, the IPI-ARM directory can be in communication with the HLR Proxy module and the IMSC (e.g., the messaging server module 230). Accordingly, the HLR Proxy module can query the IPI-ARM directory to determine if an MSISDN is an IM user. The IMSC (e.g., the messaging server module 230) can provision the IPI-ARM directory with MSISDNs of IM users.

Figure 8:
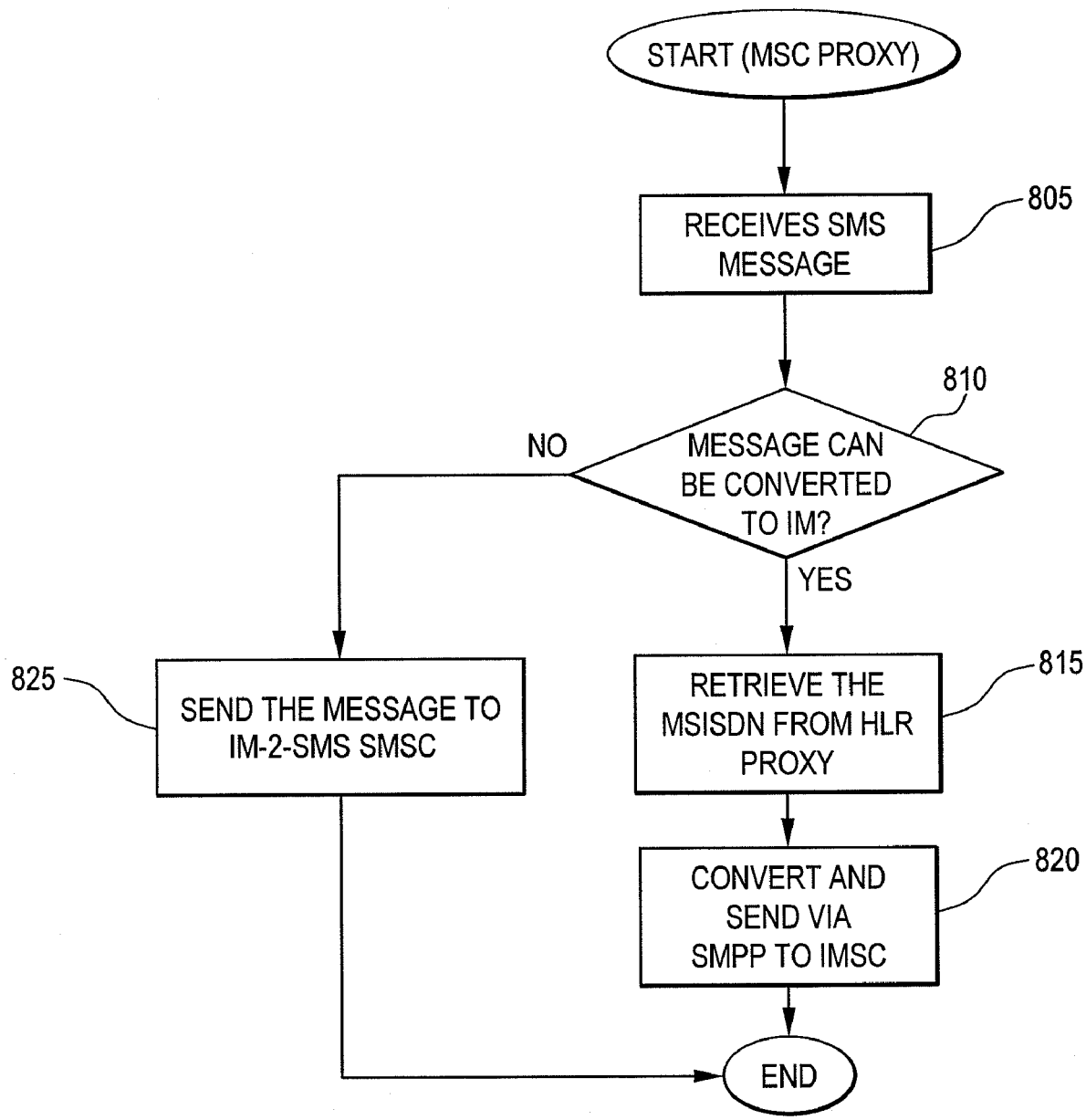
FIG. 8 is a flowchart illustrating steps performed by the MSC and HLR Proxy modules, in accordance with an exemplary embodiment of the present invention.

FIG. 8 is a flowchart illustrating steps performed by the MSC and HLR Proxy modules, in accordance with an exemplary embodiment of the present invention. In step 805, an SMS message is received (e.g., by the signaling gateway module 215 with MSC Proxy module). In step 810, a determination is made by the MSC Proxy module as to whether the SMS message can be converted to IM. If yes, then in step 815, the MSISDN can be retrieved from the HLR Proxy module. In step 820, the SMS message can be suitably converted and sent via, for example, SMPP to the IMSC (e.g., the messaging server module 230) for delivery of the (converted) IM to the IM client (e.g., the second user communication module 210).

However, if it is determined in step 810 that the SMS message cannot be converted, then in step 825, the message is sent to a suitable IM-2-SMS SMSC. According to an exemplary embodiment, the IMSC can send the message via SMPP (or standard ESME interfaces supported by IMSC and the specific SMSC) to an SMSC that is dedicated to receive the messages from the IMSC and deliver them as SMs (and not consider routing to an IMSC). Such an SMSC is referred to herein as an IM-2-SMS SMSC. It functions as a "normal" SMSC to deliver the SMs. If the SM fails to be delivered, the IM-2-SMS SMSC can report the failure to the HLR and store the SM for later delivery. The reason why such a special SMSC can be used is so that the HLR Proxy module will not respond to the SRI_for_SM message with the MSC Proxy module number when the destination MSISDN is an IM user. The HLR Proxy module can be configured with a list of E.164 numbers or point codes associated with several network nodes including the IM-2-SMS SMSC, so that any SRI_for_SM query from one of them will not get a response that includes the MSC Proxy module number. Operators with spare SMSCs can use such a scheme. However, if an operator does not have spare SMSCs to use, this would require the operator to purchase additional SMSCs, of course.

The MSC Proxy module can know when to route to the IMSC and when to route to SMSC using any of several methods. For example, one method is for the IMSC to use a new code in the TP-UDHI (the "TP User Data Header Indicator" in the first octet of the SMS TPDU, defined in "Digital Cellular Telecommunications System (Phase 2+), Technical Realization of the Short Message Service (SMS)," (GSM 03.40 version 7.4.0 Release 1998)) in the message that can trigger the MSC Proxy module to know that the SM should be delivered as the SM (e.g., 1 for "yes" and 0 for "no"). If such a scheme is used, the IMSC can send the message via SMPP to the SMSC that receives the mobile-originated SMs. The SMSC can send the SRI_for_SM, and that message would be intercepted by the HLR Proxy module that redirects the SM to the MSC Proxy module. The MSC Proxy module can be configured to detect the new code in the SM. It can query the HLR Proxy module for the MSC/SGSN number (where SGSN stands for "Service GPRS Support Node"), and delivers the SM to the MSC/SGSN number, rather than route it to the IMSC. An alternative method is for the IMSC to send the message via SMPP to the MSC Proxy module. When the MSC Proxy module receives a message from the IMSC, it knows that this particular message should be delivered as a SM. The MSC Proxy module can query the HLR Proxy module for the MSC/SGSN number, and deliver the SM to the MSC/SGSN number.

There are also various options for routing the SM. For example, the MSC Proxy module can send the SRI_for_SM message that is intercepted by the HLR Proxy module. The HLR Proxy module can recognize that the SRI_for_SM is from the MSC Proxy module based on, for example, the E.164 number in the SCCP Called Party Address, and will have the MSC/SGSN number returned in the response to the SRI_for_SM message. Such an approach would require that the MSC Proxy module act like a "normal" SMSC to generate the SRI_for_SM, receive the response to the SRI_for_SM, and send the MT_Forward_SM to the MSC or SGSN. If the message delivery fails, the MSC Proxy module can store the SM and inform the HLR about the delivery failure. Alternatively, the MSC Proxy module can use a unique protocol to interrogate with the HLR Proxy module to retrieve the IMSI and MSC/SGSN number. Such an approach would require that the MSC and HLR Proxy modules both support a suitable interface protocol for the MSC Proxy module to interrogate with the HLR Proxy module.

According to an alternative exemplary embodiment, when the user is a prepaid user (IM or SM or both), and there is a charge for mobile-terminated SM or IM, the signaling gateway module 215 can be configured to interrogate with the prepaid system to determine whether to receive the SM. Such a feature can also be supported by IPI-ARM directory if it receives an ENUM query for an MSISDN that belongs to a prepaid customer (i.e., a list of prepaid MSISDNs would need to be provisioned to the signaling gateway module 215 and/or IPI-ARM directory). If the prepaid customer does not have sufficient balance/credit in the account, the SRI_for_SM message can get a negative response.

Figure 9:
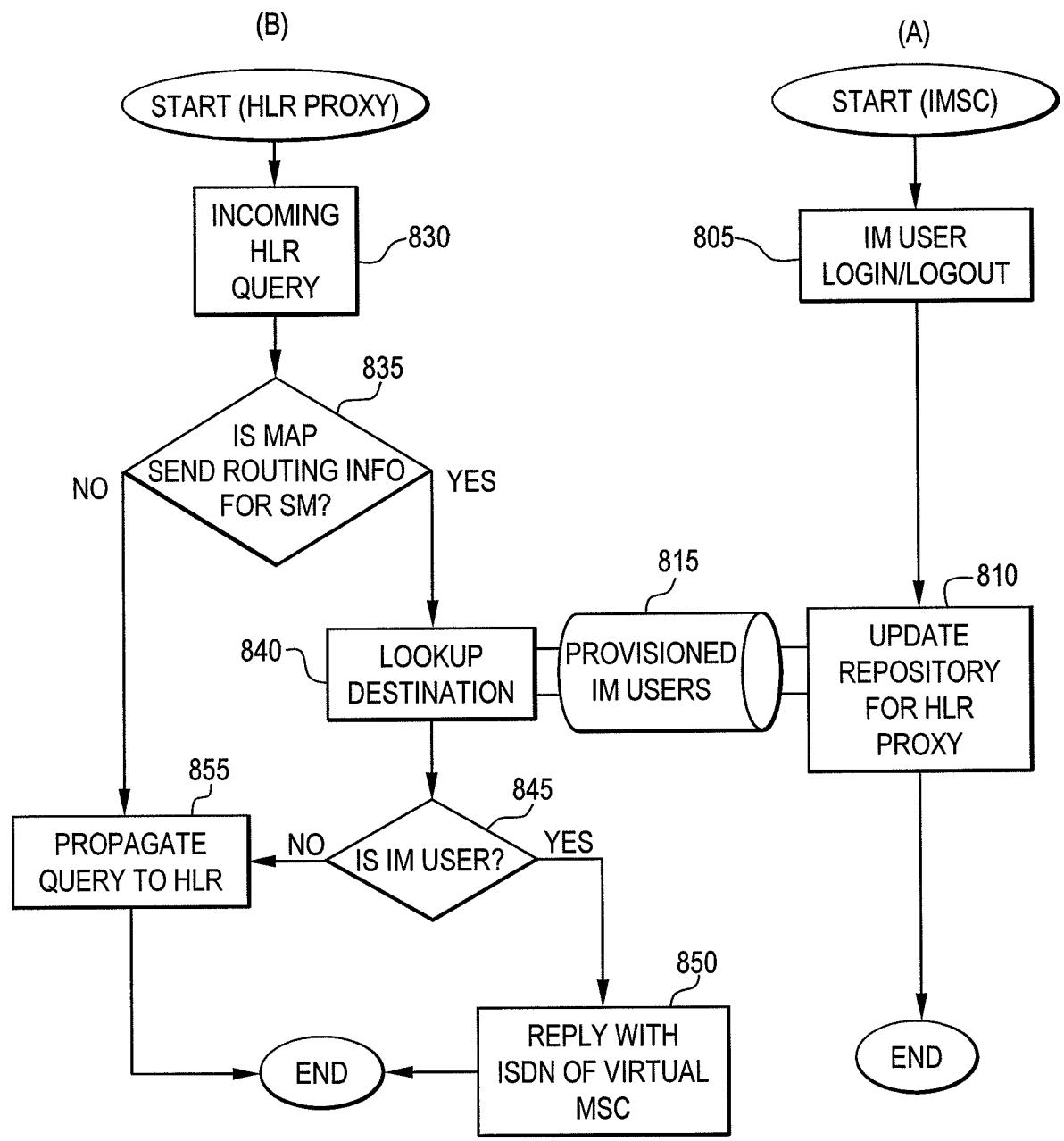
FIG. 9 is a flowchart illustrating steps performed by the HLR Proxy module and IMSC, in accordance with an exemplary embodiment of the present invention.

FIG. 9 is a flowchart illustrating steps performed by the HLR Proxy module and IMSC, in accordance with an exemplary embodiment of the present invention. For the start of the basic operation of the IMSC in FIG. 9A for provisioning, the IM user can either login or logout of the IM service. Either event can cause an update to the repository (e.g., the IPI-ARM directory) for the HLR Proxy module. Such an update can be accomplished in step 815 by the IMSC (e.g., the messaging server module 230) provisioning the IPI-ARM directory with MSISDNs of IM users (through addition or deletion of such information). In other words, the IM enabler can inform the IPI-ARM directory which users are IM users.

For the start of the basic operation of the HLR Proxy module in FIG. 9B on sending of a short message, in step 830, an incoming HLR query can be received by the HLR proxy module. In step 835, a determination can be as to whether Mobile Application Part (MAP)—one of the protocols in the SS7 suite—is sending routing information for the SM. If so, then in step 840, a destination lookup can be performed by the HLR Proxy module by querying the IPI-ARM directory for provisioned IM users. In step 845, a determination can be made as to whether the user is an IM user, based on the information of provisioned IM users. If yes, then in step 850, the HLR Proxy module can generate a reply with the MSISDN of the "virtual MSC." In other words, the virtual MSC address is the address of the MSC Proxy module that is given instead of the "real" MSC address. Accordingly, the SM can be intercepted by the MSC Proxy module (and signaling gateway module 215) so that the short message can be forwarded to the IM enabler (IMSC) for termination as an IM, if necessary. However, if the determination is negative in either of steps 835 and 845, then in step 855, the HLR Proxy module can propagate an appropriate query to the HLR (e.g., user information database module 225) for routing the SM.

According to an exemplary embodiment, the HLR Proxy module can "sit" between the HLR (e.g., the user information database module 225) and a STP (a Signal Transfer Point). A STP is a packet switching device that performs the message routing function in SS7 networks. The STP can receive, discriminate, and transfer SS7 messages between the signaling points with which it is connected. The STPs are generally duplexes in a paired operation for reasons of signaling availability. Besides the message routing function, an STP can provide functionality such as gateway screening and global title translation. According to exemplary embodiments, the STP passes SMS messages between operators and queries the HLR with SRI_for_SM messages to determine the IMSI (International Mobile Subscriber Identity).

Figure 10A:
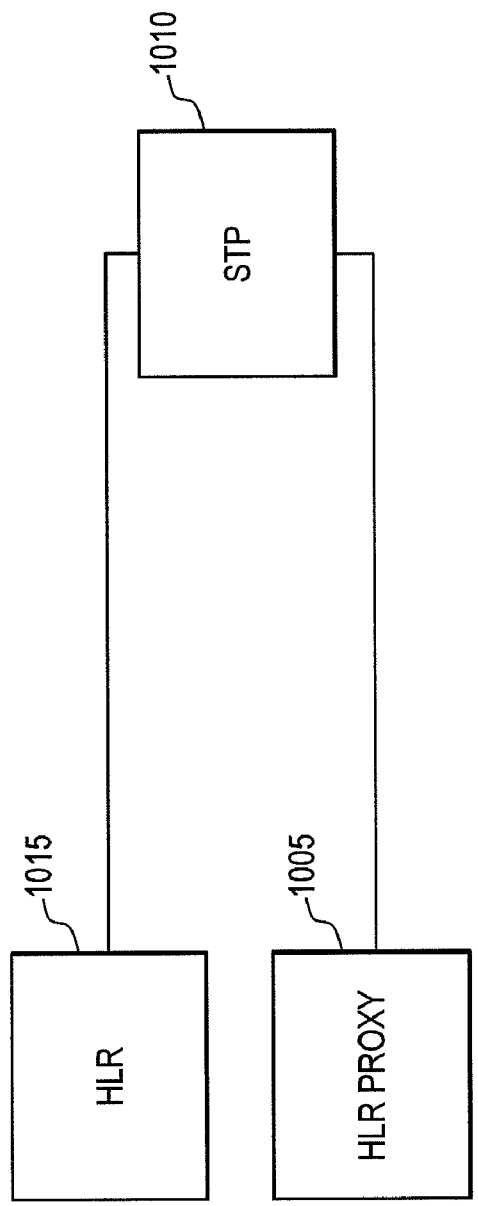
FIGS. 10A and 10B are block diagrams illustrating alternative deployment models for the HLR Proxy module, in accordance with an exemplary embodiment of the present invention.
Figure 10B:
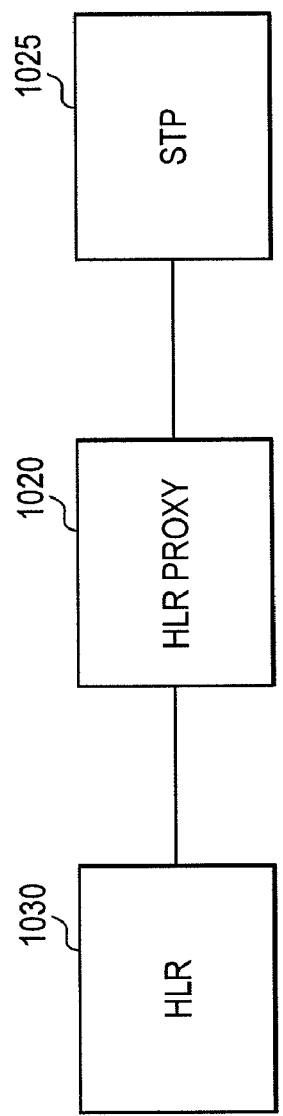

FIGS. 10A and 10B are block diagrams illustrating alternative deployment models for the HLR Proxy module, in accordance with an exemplary embodiment of the present invention. FIG. 10A illustrates a "one arm" implementation, in which the HLR Proxy module 1005 is connected or otherwise in communication with the STP 1010 as a peer to the existing HLR(s) 1015. In a one armed deployment, the HLR-to-STP connection is not changed. The HLR Proxy module 1005 is introduced into the network, and has its own, independent connections to the STP 1010. Routing in the STP 1010 causes messages to be sent to the HLR Proxy module 1005 instead of the HLR 1015. The HLR Proxy module 1005 can address the HLR 1015 through the STP 1010. The HLR Proxy module 1005 has a point code independent of the HLR 1015. The advantages of the one armed deployment are that it is less intrusive into the operator's network, and, in some deployments, fewer messages need to be passed through the HLR Proxy module 1005 if the STPs 1010 can redirect some of the GSM MAP messages to the HLR Proxy module 1005 instead of the HLR 1015. Less intrusiveness is beneficial, since the HLR 1015 is the "heart" of the operator's network, and anything that threatens its stability could pose problems. Using suitable STP filtering capability GSM MAP operation-aware, and a mechanism called "Special Global Title Translation Tables," it is possible to get only certain messages, such as the SRI_for_SM, to be diverted from the HLR 1015 to the HLR Proxy module 1005. Similarly, the HLR Proxy module 1005 can forward message it receives to the HLR 1015, such that the reply to the message goes directly from the HLR 1015 to the entity that originated it, thus requiring less work on the HLR Proxy module 1015.

Alternatively, FIG. 10B illustrates a "two arm" implementation, in which the HLR Proxy module 1020 is connected or otherwise in communication between the STP 1025 and the HLR 1030. A "two arm" deployment physically inserts the HLR Proxy module 1020 between the HLR 1030 and the STP 1025. The proxy has two sets of links—the HLR 1030 is unplugged from the STP 1025, and the STP 1025 connection is plugged into one set of those links. The HLR 1030 is plugged into the other set. Every message intended for the HLR 1030 passes through the HLR Proxy module 1020, and every message from the HLR 1030 passes through the HLR Proxy module 1020. No routing changes are required. The HLR Proxy module 1020 does not have a point code, as it "looks" like the HLR 1030 from the perspective of the STP 1025 or like the STP 1025 from the perspective of the HLR 1030. The HLR 1030 is normally connected with a STP pair, so the HLR Proxy module 1020 can be connected with the STP pair (although FIG. 10B illustrates only one STP 1025). Inserting the HLR Proxy module 1020 between the HLR 1030 and the STP 1025 is more intrusive than the one-armed deployment. However, the ability of the HLR Proxy module 1020 to "see" all the messages in and out of the HLR 1020 gives it the ability to detect the presence status without the need to upgrade the HLR 1020 to do such work or use another device to tap at the SS7 link terminations at the HLR 1030 or STP 1025 side to detect the presence status.

However, STP ports are expensive. The one armed solution leaves the HLR ports on the STP alone, and adds additional ports for the HLR Proxy module. When PNA is deployed, nearly every message, and every response, will transit the HLR Proxy module if the HLR Proxy module is to detect the presence status. (A PNA or Presence Network Agent gathers presence data from various points in the network and from existing network elements, and sends that information to the Presence Server.) Accordingly, the HLR Proxy module will need a set of STP ports approximately the same as the those to get the messages the HLR proxy module should have gotten, and then it needs another set of ports, approximately the same number, to forward messages and receive responses to/from the HLR. Thus, the STP will have to handle each message and each response twice. As an alternative to avoid using the HLR Proxy module to track the presence status, the operator can either upgrade the HLR to track the present status or deploy another device to perform such functionality.

Figure 11A:
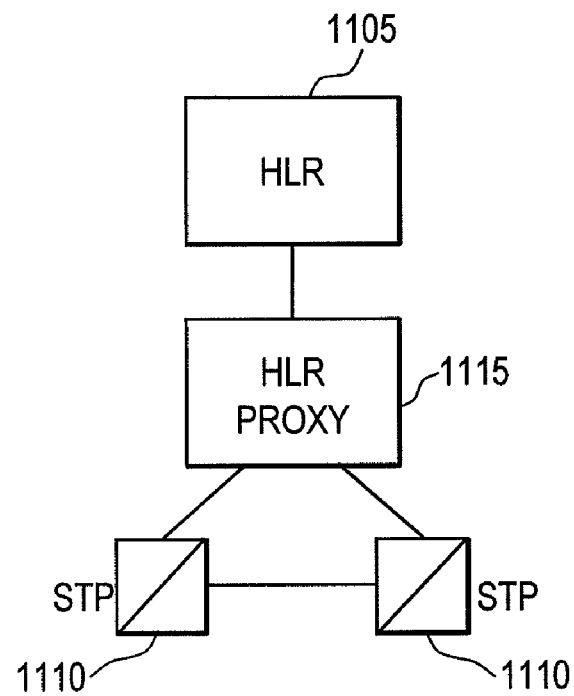
FIGS. 11A and 11B illustrate alternative modes for deploying an HLR Proxy module in an operator's network, in accordance with an exemplary embodiment of the present invention.
Figure 11B:
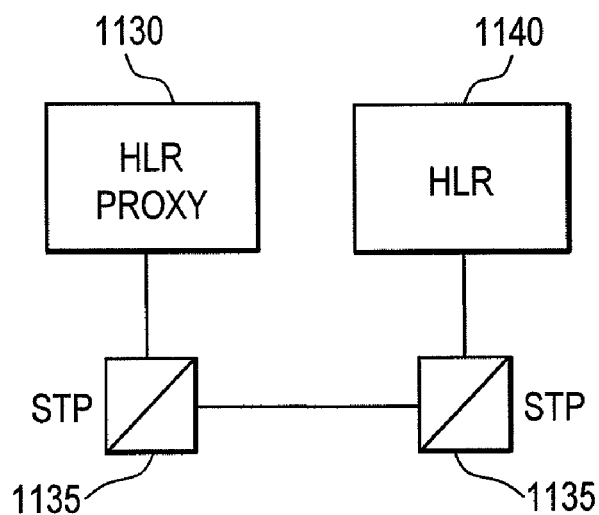

FIGS. 11A and 11B illustrate alternative modes for deploying an HLR Proxy module in an operator's network, in accordance with an exemplary embodiment of the present invention. In FIG. 11A, the HLR 1105 is connected with an STP pair 1110. In this "Forward Mode," the HLR Proxy module 1115 is inserted between the STP pair 1110 and the HLR 1105. Every message that goes from the STP 1110 to the HLR 1105 or from the HLR 1105 to the STP 1110 goes through the HLR Proxy module 1115. The HLR Proxy module 1115 is configured to modify the SRI_for_SM_Ack message received from the HLR 1105 by replacing the MSC's E.164 number or the SGSN's E.164 number or both with the MSC Proxy module's E.164 number, when the HLR Proxy module 1115 determines that the SM needs to be sent by the IM. The HLR Proxy module 1115 does nothing if the SM is delivered as the SM. Because the HLR Proxy module 1115 "sees" every message in and out of the HLR 1105, it could monitor some of the messages to learn the "attached/detached" or "home/roaming" status of the mobile devices (e.g., for PNA usage).

In the "Redirect Mode" illustrated in FIG. 11B, the HLR Proxy module 1130 is connected with an STP pair or STP pairs 1135. The messages that are destined towards the HLR 1140, when Global Title Translation (GTT)-routed are redirected to the HLR Proxy module 1130. Such functionality can be achieved by modifying the GTT tables at those STPs 1135 that perform the final GTTs, so that the point code of the HLR 1140 is replaced by the point code of the HLR Proxy module 1130. It does not matter if the STP 1135 marks the message as for intermediate or final GTT. If the operator's STPs 1135 have the ability to filter out the SRI_for_SM, the SRI_for_SM messages can be routed to the HLR Proxy module 1130 for processing. This can limit the number of the messages that are redirected to the HLR Proxy module 1130. The HLR Proxy module 1130 can forward the SRI_for_SM to the HLR 1140 if it decides that the SM should not be converted to the IM. The HLR 1140 can then respond directly by returning the SRI_for_SM_Ack to the SMS-GMSC. If the SM should be sent to the IMSC, the HLR Proxy module 1130 can respond directly to the SMS-GMSC with the MSC Proxy module's E.164 number if it has the IMSI for the queried MSISDN. The HLR Proxy module 1130 can get the IMSI associated with an MSISDN by sending the SRI_for_SM at any appropriate time.

Figure 12:
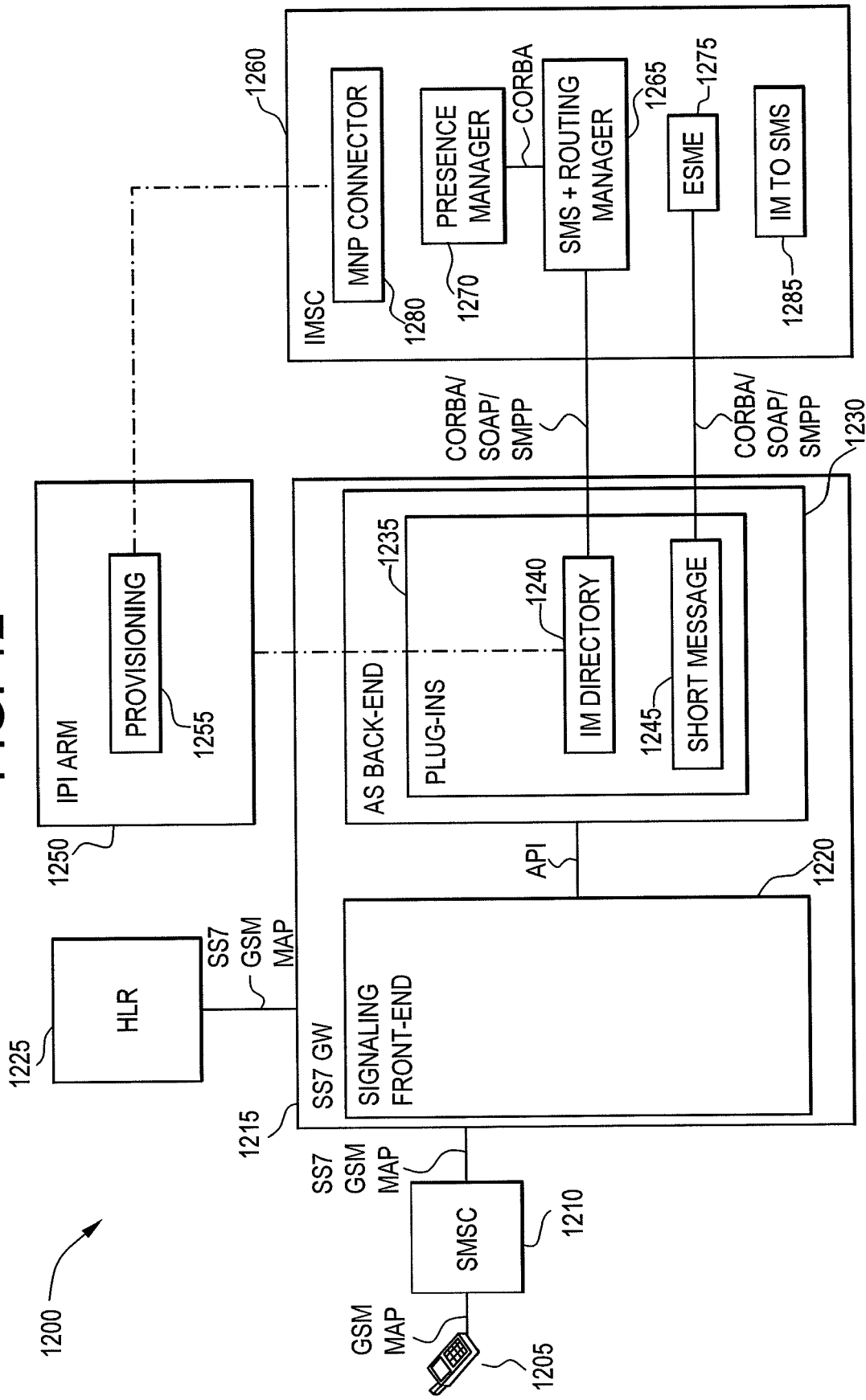
FIG. 12 illustrates a component-based architecture of the system illustrated in FIG. 2, in accordance with an exemplary embodiment of the present invention.

FIG. 12 illustrates a component-based architecture 1200 of the system 200, in accordance with an exemplary embodiment of the present invention. A suitable SMS client 1205 is configured to communicate with a SMSC 1210 via a GSM/MAP transport service. The SMSC 1210 is configured to communicate with the SS7 gateway 1215 via a SS7/GSM/MAP transport service. The SS7 gateway 215 includes a signaling front end 1220 that is in communication with a HLR 1225 via a SS7/GSM/MAP transport service. The SS7 gateway 1215 includes a signaling back end 1230 in communication with the signaling front end 1220. The signaling back end 1230 can include suitable plug-ins 1235, including, but not limited to, an IM directory plug-in 1240 and a short message plug-in 1245. The IM directory plug-in 1240 is configured to communicate or otherwise receive information from an IPI-ARM directory 1250 that is configured with an IM provisioning module 1255.

The SS7 gateway 1215 is in communication with an IMSC 1260. In particular, the IM directory plug-in 1240 is configured to communicate with a SMS continuity routing manager 1265 in the IMSC 1260 using a CORBA/SOAP/SMPP interface. The SMS continuity routing manager 1265 is in communication with a presence manager 1270 (e.g., via a CORBA or like interface) within the IMSC 1260. The short message plug-in 1245 is configured to communicate with an ESME module 1275 in the IMSC 1260 using a CORBA/SOAP/SMPP or other suitable interface. The IMSC 1260 includes a MNP connector module 1280 for communicating information between the IMSC 1260 and the IM provisioning module 1255 of the IPI-ARM directory 1250. The IMSC 1260 further includes an IM-2-SMS module 1285, described previously.

Figure 13:
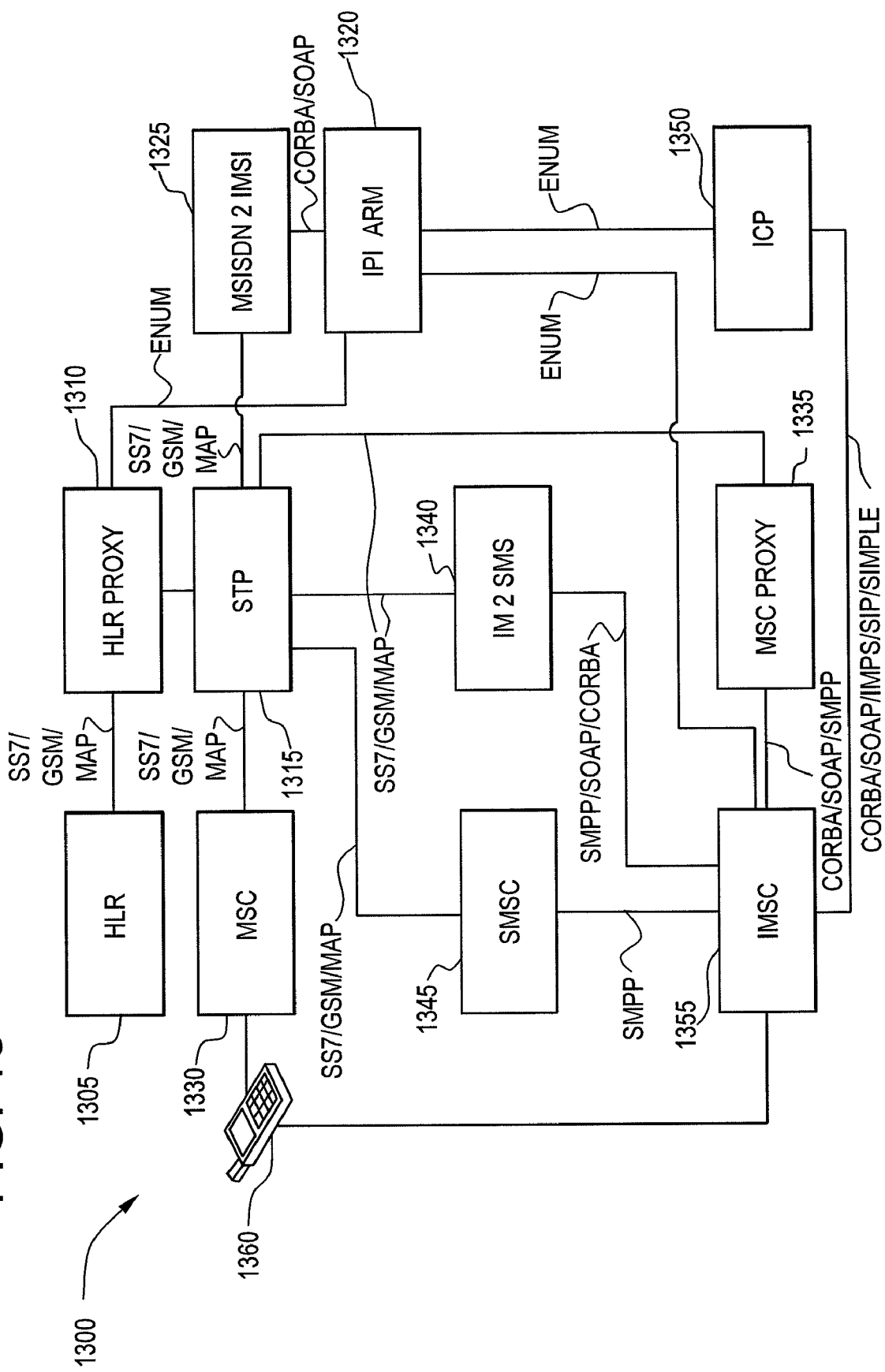
FIG. 13 is block diagram illustrating an exemplary embodiment of the present invention that incorporate the HLR Proxy module, the MSC Proxy module, and the IM-2-SMS module.

FIG. 13 is block diagram illustrating an exemplary embodiment of the present invention that incorporate the HLR Proxy module, the MSC Proxy module, and the IM-2-SMS module. The system 1300 includes a HLR 1305 that is in communication with a HLR Proxy module 1310 using a SS7/GSM/MAP transport service. The HLR Proxy module 1310 is in communication with a STP 1315. The HLR Proxy module 1310 is configured to communicate ENUM queries with an IPI-ARM directory 1320. The STP 1315 is configured to communicate with each of a MSISDN-2-IMSI 1325, a MSC 1330, a MSC Proxy module 1335, a IM-2-SMS module 1340, and a SMSC 1345 using a SS7/GSM/MAP transport service. The IPI-ARM directory 1320 is configured to communicate with the MSISDN-2-IMSI 1325 using a CORBA/SOAP or other suitable interface. The IPI-ARM directory 1320 is configured to communicate ENUM queries with a ICP 1350. The ICP 1350 is in communication with an IMSC 1355 using a CORBA/SOAP/IMPS/SIP/SIMPLE or other like interface. The ICP or Inter-Connect Platform 1350 is configured to pass IM messages between operators. In particular, the ICP 1350 is configured to pass IM messages between the IMSC of the sending operator and the IMSC of the receiving operator. The ICP 1350 is configured to query the IPI-ARM directory 1320 (e.g., using ENUM queries) to determine the IM Uniform Resource Identifier (URI), and to locate the proper target IMSC. The IMSC 1355 is configured to communicate ENUM queries with the IPI-ARM directory 1320. The IMSC 1355 is further configured to communicate with the SMSC 1345 using a SMPP or other suitable interface, and with each of the IM-2-SMS module 1340 and MSC Proxy module 1334 using a SMPP/SOAP/CORBA or like interface. A mobile device 1360 is in communication with both of the MSC 1330 and IMSC 1355.

Figure 14:
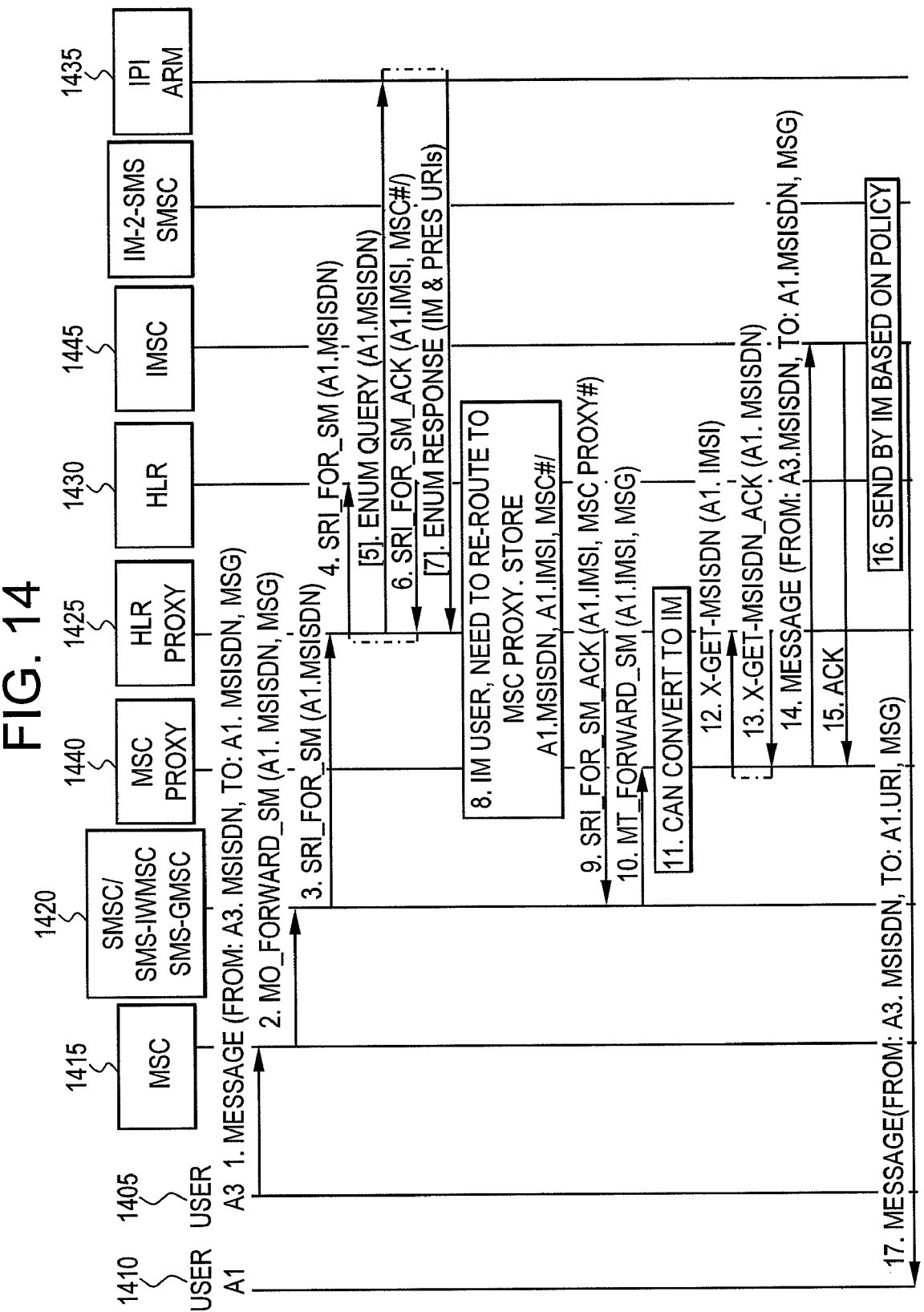
FIG. 14 is a sequence diagram illustrating steps for communicating a SMS message from a SMS client to an IM client, in accordance with an exemplary embodiment of the present invention.

FIG. 14 is a sequence diagram illustrating steps for communicating a SMS message from a SMS client 1405 (user A3) to an IM client 1410 (user A1), in accordance with an exemplary embodiment of the present invention. User A3 has a first MSISDN, and wishes to send the message to user A1 with a second MSISDN. In step 1, the user A3 sends the SMS message to the MSC 1415. The message specifies the first MSISDN of user A3 and the second MSISDN of user A1. In step 2, the MSC 1415 forwards a MO_Forward_SM message, including the MSISDN of user A1, to a SMSC 1420. In step 3, the SMSC 1420 forwards a SRI_for_SM message (including the MSISDN of user A1) to a HLR Proxy 1425. In step 4, the HLR Proxy 1425 communicates the SRI_for_SM message to a HLR 1430. In step 5, the HLR Proxy 1425 also forwards an ENUM query (including the MSISDN of the user A1) to an IPI-ARM directory 1435. In step 6, the HLR 1430 responds by returning a SRI_for_SM_Ack message (including the IMSI of user A1 and the MSC number) to the HLR Proxy 1425. In step 7, the IPI-ARM directory 1435 also responds by returning an ENUM response (including the IM and presence URIs of user A1) to the HLR proxy 1425. In step 8, if user A1 is an IM user (in the present example, yes), then the message must be re-routed to the MSC Proxy 1440, and the MSISDN and IMSI of A1, as well as the MSC number, are stored. Accordingly, in step 9, a SRI_for_SM_Ack message is forwarded from the HLR Proxy 1425 to the SMSC 1420. Note that this SRI_for_SM_Ack message includes the IMSI of user A1, and the MSC Proxy number.

In step 10, a MT_Forward message (including the IMSI of user A1) is communicated from the SMSC 1420 to the MSC Proxy 1440. In step 11, the message can be converted to IM. In step 12, the MSC Proxy 1440 forwards a X_Get_MSISDN message (including the IMSI of user A1) to the HLR Proxy 1425. In step 13, the HLR Proxy 1425 returns a X_Get_MSISDN_Ack message with the MSISDN of user A1 to the MSC Proxy 1440. In step 14, the MSC Proxy 1440 forwards the message to the IMSC 1445 (including the MSISDN of user A3 and the MSISDN of user A1). In step 15, the IMSC sends an ACK message back to the MSC Proxy 1440 to acknowledge receipt of the message. In step 16, the message can be sent by IM by the IMSC 1445 in accordance with policy established for the IMSC and user A1. In step 17, the IM message can be transmitted from the IMSC 1445 to the URI of user A1. Thus, according to exemplary embodiments, the SMS message sent from user A3 at the first MSISDN can be converted to an IM message and properly routed to the user A3 at the appropriate URI.

Figure 15:
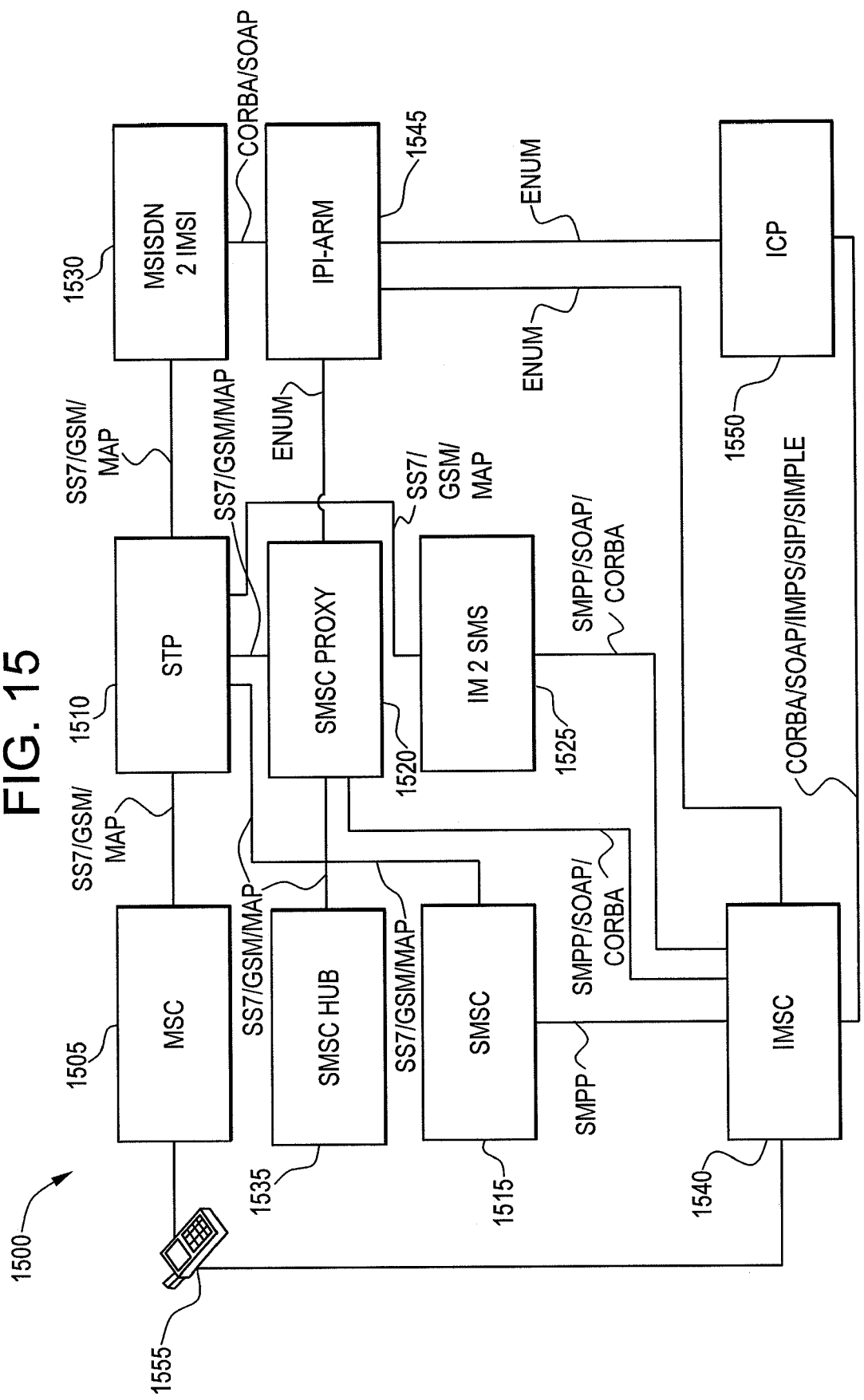
FIG. 15 is block diagram illustrating an IM and SMS continuity system using a SMSC Proxy, in accordance with an alternative exemplary embodiment of the present invention.

FIG. 15 is block diagram illustrating an IM and SMS continuity system 1500 using a SMSC Proxy, in accordance with an alternative exemplary embodiment of the present invention. The system 1500 uses the SMSC proxy to allow local SMS and IM interoperability, and with an optionally existing SMSC Hub. Some operators can have all of their SMS traffic go thru a SMSC hub so they can do spam control and the like. Such a configuration allows for the SMS Proxy to filter out the messages that are destined to be converted into IM instead of relying on the HLR Proxy module. Such a configuration is very efficient, because the SMS Proxy will only look at the SMS messages, rather than all of the messages as required by the HLR Proxy module. If an SMSC hub does not exist, and SMSC Proxy would be limited to allowing SMS and IM continuity only within the operator.

The system 1500 includes a MSC 1505. The MSC 1505 is configured to communicate with a STP 1510 using a SS7/GSM/MAP transport service. The STP 1505 is configured to communicate with each of a SMSC, a SMSC Proxy module 1520, a IM-2-SMS module 1525, and MSISDN-2-IMSI module using a SS7/GSM/MAP transport service. The SMSC Proxy module 1520 is configured to communicate with a SMSC hub 1535 using a SS7/GSM/MAP transport service. The SMSC Proxy module 1520 is configured to communicate with an IMSC 1540. The SMSC Proxy module 1520 is configured to communicate ENUM queries with a IPI-ARM directory 1545. The MSISDN-2-IMSI module 1530 is configured to communicate with the IPI-ARM directory 1545 using a CORBA/SOAP or other suitable interface. The IPI-ARM directory 1545 is configured to communicate ENUM queries with each of a ICP 1550 and the IMSC 1540. The ICP 1550 and the IMSC 1540 are configured to communicate with each other using a CORBA/SOAP/IMPS/SIP/SIMPLE or other suitable interface. The IMSC 1540 is configured to communicate with the IM-2-SMS module 1525 using a SMPP/SOAP/CORBA interface. The IMSC 1540 is further configured to communicate with the SMSC 1515 using a SMPP or other suitable interface. A mobile device 1555 is in communication with both of the MSC 1505 and IMSC 1540.

Figure 16:
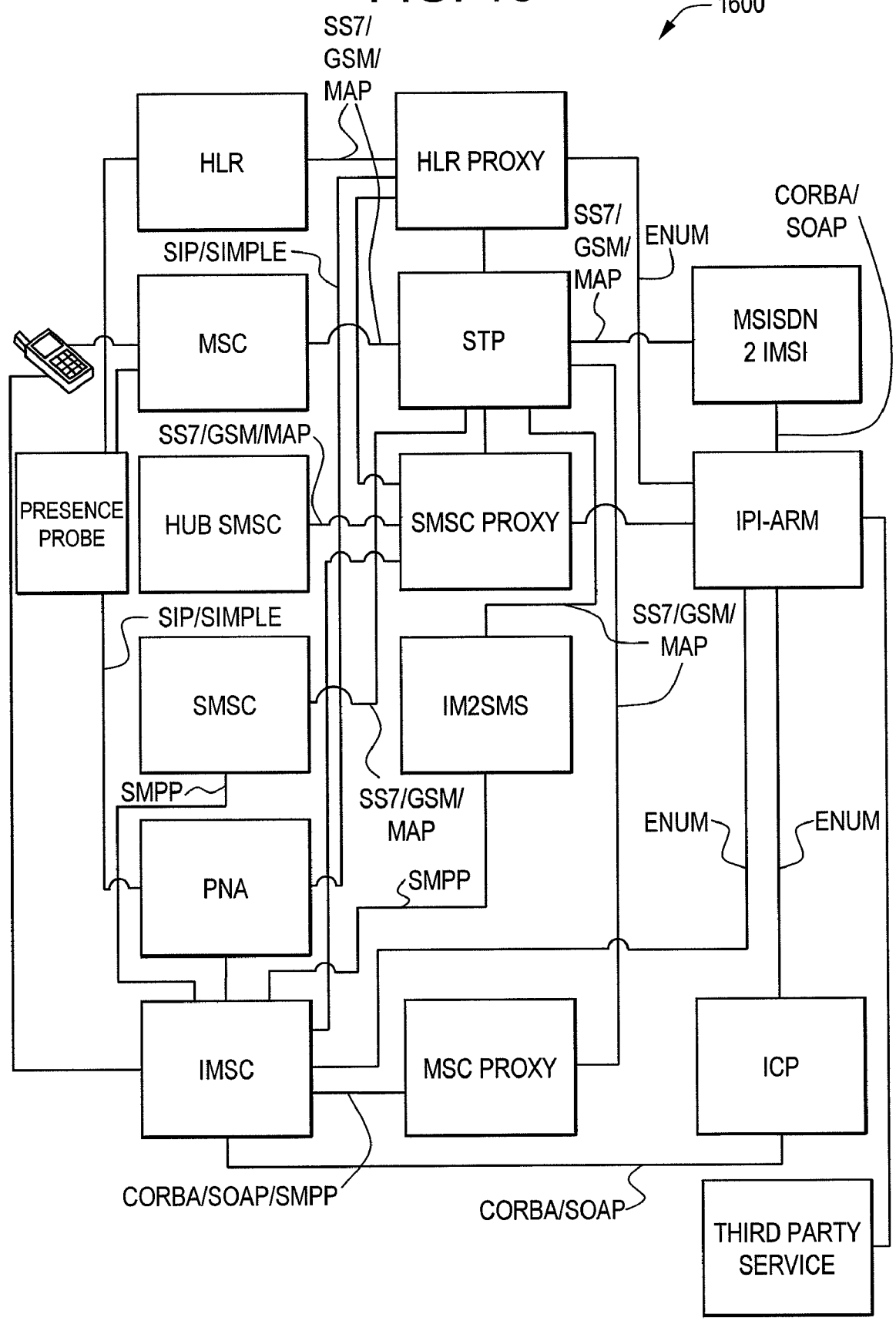
FIG. 16 is a block diagram illustrating a complete system incorporating the functionality of the systems illustrated in FIGS. 13 and 15, in accordance with an alternative exemplary embodiment of the present invention.

FIG. 16 is a block diagram illustrating a complete system 1600 incorporating the functionality of the systems illustrated in FIGS. 13 and 15, in accordance with an alternative exemplary embodiment of the present invention. The system 1600 allows mixed HLR/MSC Proxy and/or SMSC Proxy and SMSC hub, with additional presence network detection and third party access.

According to an additional exemplary embodiment, to route the appropriate message-related SMS traffic, but not other kinds or types of SMS traffic, a suitable type of filter in the SS7 application or the IM Enabler can route SMS traffic that is not message-related back to the SMSC. Accordingly, the signaling gateway module 215 (or the messaging server module 230) can include a message filter module 240. The message filter module 240 can be configured to allow routing through the signaling gateway module 215 of messages communicated from the first user communication module 205 using the first messaging service 207. In particular, the message filter module 240 can be configured to block non-message-related information communicated from the first user communication module 205 using the first messaging service. For example, the message filter module 240 can be configured to return the non-message-related information to the first user communication module 205 (via the communication server module 220). For example, the message filter module 240 can identify OTA (Over-the-Air) and/or SMS CIR and/or SMS Type 0 (or other like information) from the message, and use such information for purposes of filtering.

According to a further exemplary embodiment of the present invention, several alternative methods can be used to avoid loops (e.g., the SMSC re-routing messages back to the SS7 application based on the HLR configuration). For example, a different SMSC can be used. When the IM enabler initiates IM-to-SMS, the IM enabler can go to a specific, dedicated SMSC that is not configured to look up the directory or route to the IMSC, so no loop occurs. Alternatively, the MSC Proxy module can used. In particular, the IM enabler can designate a message originated by it, within the short message itself. When the MSC Proxy module receives the message, the MSC Proxy module can determine that the message was originated by the given IM enabler. The MSC Proxy module can thus send the message directly to the "real" MSC and, accordingly, the destination user. To designate the message, the header within the short message that is reserved to identify the IMSC can be used without violating any established standards. Alternatively, a designator can be embedded within the short message itself (sometimes referred to as "decoration"). If the designator is found within the message, the MSC Proxy module can "undecorated" the message and forward it to the SMS user instead of the SMSC. This scenario is also referred to as "escape sequencing." Additionally or alternatively, one or both of the first and second user communication modules 205 and 210 can each be associated with at least two addresses, such as, for example, dual MSISDNs (e.g., one MSISDN for IM and the second for other traffic). One of the addresses can be adapted for use in returning the non-message-related information to the given user communication module. For example, for SMS traffic other than that related to SMS messages, such SMS traffic can be sent (back) to a MSISDN assigned to the given user communication module for receiving such traffic. Other such mechanisms can be used to prevent looping in the system.

Those of ordinary skill in the art will recognize that each of the modules of the system 200 can be located locally to or remotely from each other, while use of the system 200 as a whole still occurs within a given country, such as the United States. For example, merely for purposes of illustration and not limitation, the second user communication module 210, the signaling gateway module 215 (with the message filter module 240), the user information database module 225 (and user information database proxy module 245), the messaging server module 230, and the communication server module 235 (or any combination of such modules) can be located extraterritorially to the United States (e.g., in Canada and/or in one or more other foreign countries). However, the first user communication module 205 and the communication server module 220 can be located within the United States, such that the control of the system 200 as a whole is exercised and beneficial use of the system 200 is obtained by the user within the United States.

Each of modules of the system 200, including the first user communication module 205, the second user communication module 210, the signaling gateway module 215 (with the message filter module 240), the communication server module 220, the user information database module 225, the messaging server module 230, the communication server module 235, and the user information database proxy module 245 (including the HLR, MSC, and SMSC Proxy modules discussed herein), or any combination thereof, can be comprised of any suitable type of electrical or electronic component or device that is capable of performing the functions associated with the respective element. According to such an exemplary embodiment, each component or device can be in communication with another component or device using any appropriate type of electrical connection or communication link (e.g., wireless, wired, or a combination of both) that is capable of carrying such information. Alternatively, each of the modules of the system 200 can be comprised of any combination of hardware, firmware and software that is capable of performing the functions associated with the respective module.

Alternatively, the system 200 can be comprised of one or more microprocessors and associated memory(ies) that store the steps of a computer program to perform the functions of one or more of the modules of the system 200. The microprocessor can be any suitable type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), an electrically-erasable programmable read-only memory (EEPROM), a computer-readable medium, or the like. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory can be programmed using conventional techniques known to those having ordinary skill in the art of computer programming to perform the functions of one or more of the modules of the system 200. For example, the actual source code or object code of the computer program can be stored in the memory.

The system 200 can include suitable additional modules as necessary to assist or augment the functionality of any or all of the modules of the system 200. For example, the system 200 can include a database or storage module that can be in communication with, for example, one or more of the signaling gateway module 215, the communication server module 220, the user information database module 225, the messaging server module 230, the communication server module 235, and/or the user information database proxy module 245. Such a storage module can be configured to store any suitable type of information generated or used by or with the system 200, including, for example, message information, configuration information, and other like information. Such a storage module can be comprised of any suitable type of computer-readable or other computer storage medium capable of storing information in electrical or electronic form.

Figure 4:
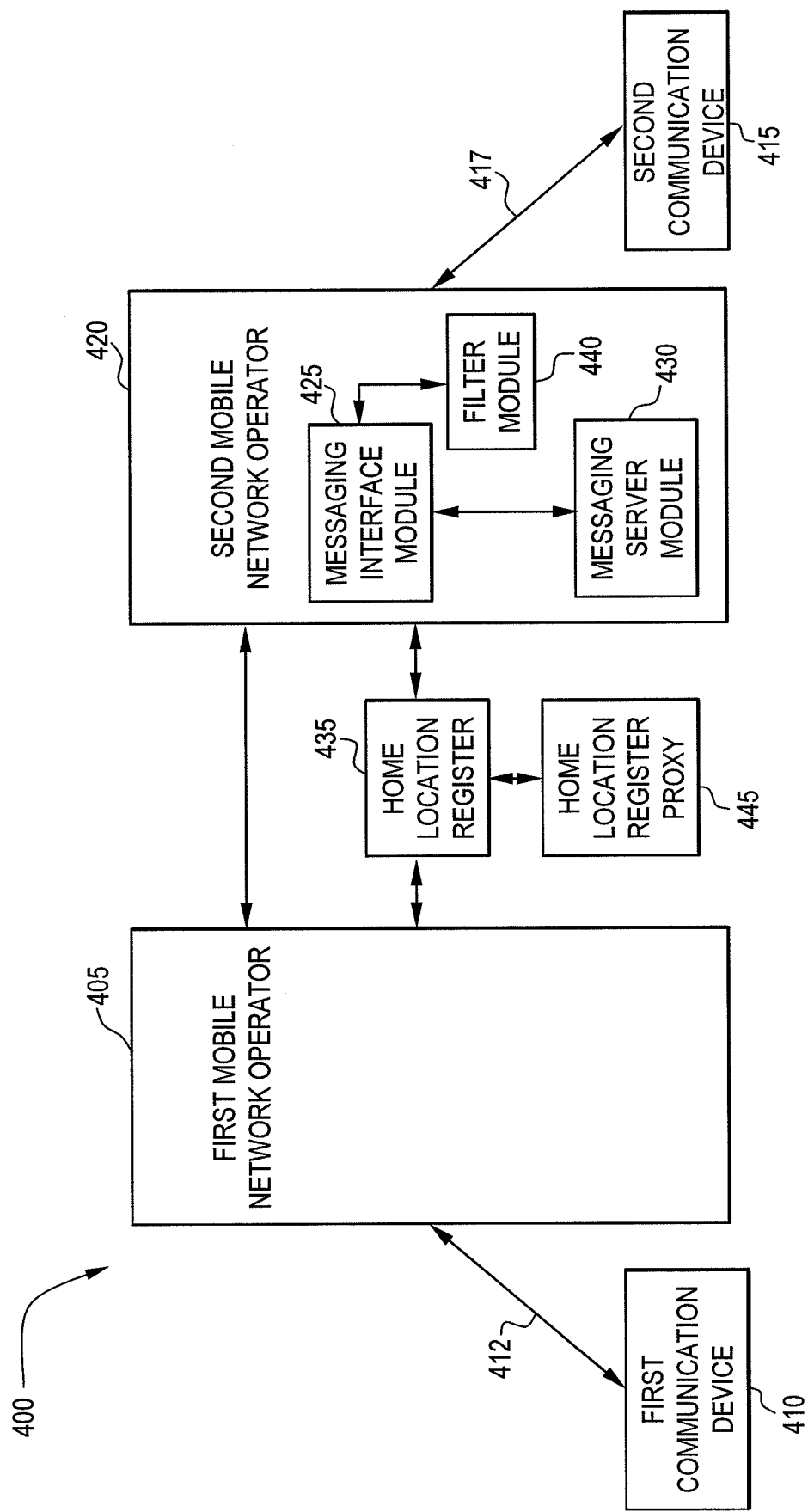
FIG. 4 is a block diagram illustrating a system for communicating information between users, in accordance with an alternative exemplary embodiment of the present invention.

Alternative architectures or structures can be used to implement the various functions of the system 200 as described herein. For example, functions from two or more modules can be implemented in a single module, or functions from one module can be distributed among several different modules. FIG. 4 is a block diagram illustrating a system 400 for communicating information between users, in accordance with an alternative exemplary embodiment of the present invention.

The system 400 includes a first mobile network operator 405 in communication with a first communication device 410. The first communication device is configured to communicate a message to a second communication device 415 using a first messaging service 412. The second communication device 415 is configured to communicate messages using a second messaging service 417. The system 400 includes a second mobile network operator 420 in communication with the first mobile network operator 405 and the second communication device 415. According to an exemplary embodiment, the first messaging service 412 can comprise, for example, SMS or the like, and the first communication device 410 can comprise, for example, a SMS device or the like. Additionally, the second messaging service 417 can comprise, for example, IM or the like, and the second communication device 415 can comprise, for example, an IM device or the like. Accordingly to an additional exemplary embodiment, the first mobile network operator can comprise, for example, a SMSC or the like.

The second mobile network operator 420 includes a messaging interface module 425. The messaging interface module 425 can be configured to interface messages between the first messaging service 412 and the second messaging service 417 (e.g., in a manner similar to that described previously for the signaling gateway module 215). For example, according to an exemplary embodiment, the messaging interface module 425 can comprise a SS7 application module or the like. The second mobile network operator 420 also includes a messaging server module 430 in communication with the messaging interface module 425. For example, according to an exemplary embodiment, the messaging server module 430 can comprise an IM enabler module or the like. The messaging server module 430 is configured to use the second messaging service 417 for communicating messages to the second communication device 415 (e.g., in a manner similar to that described previously for the messaging server module 230). The first mobile network operator 405 is configured to route the message from the first communication device 410 to the messaging interface module 425 in accordance with address information associated with the second communication device 415. The messaging interface module 425 is further configured to route the message to the messaging server module 430. The messaging server module 430 is configured to deliver the message to the second communication device 415 using the second messaging service 417.

The system 400 can include HLR 435 in communication with at least the first mobile network operator 405. The HLR 435 is configured to store the address information of at least the second communication device 415 (e.g., in a manner similar to that described previously for the user information database module 225). According to an exemplary embodiment, the address information of the second communication device 415 can comprise a MSISDN or other like address information. The first mobile network operator module 405 is configured to obtain the address information associated with the second communication device 415 from the HLR 435 for routing the message to the messaging interface module 425. The messaging interface module 425 is configured to modify the address information of the second communication device 415 stored in the HLR 435 so that messages between the first and second communication devices 410 and 415 are routed through the messaging interface module 425. The second mobile network operator 420 can include a filter module 440 in communication with the messaging interface module 425. The filter module 440 can be configured to allow routing through the messaging interface module 425 of messages communicated from the first communication device 410 using the first messaging service 412 (e.g., in a manner similar to that described previously for the message filter module 240). In particular, the filter module 440 can be configured to block non-message-related information communicated from the first communication device 410 using the first messaging service 412. The filter module 440 can also be configured to return such non-message-related information to the first communication device 410.

The system 400 can include a HLR proxy 445 in communication with at least the first mobile network operator 405. The HLR proxy 445 can be configured to prevent the returned non-message-related information from being routed back to the messaging interface module 425 (e.g., in a manner similar to that described previously for the user information database proxy module 245). Additionally or alternatively, either or both of the first communication device 410 and the second communication device 415 can each be associated with at least two addresses. One of the at least two addresses can be adapted for use in returning the non-message related information to the first communication device 410. Other alternative architectures or structures can be used to implement the various functions of the systems 200 and 400 as described herein.

Figure 5:
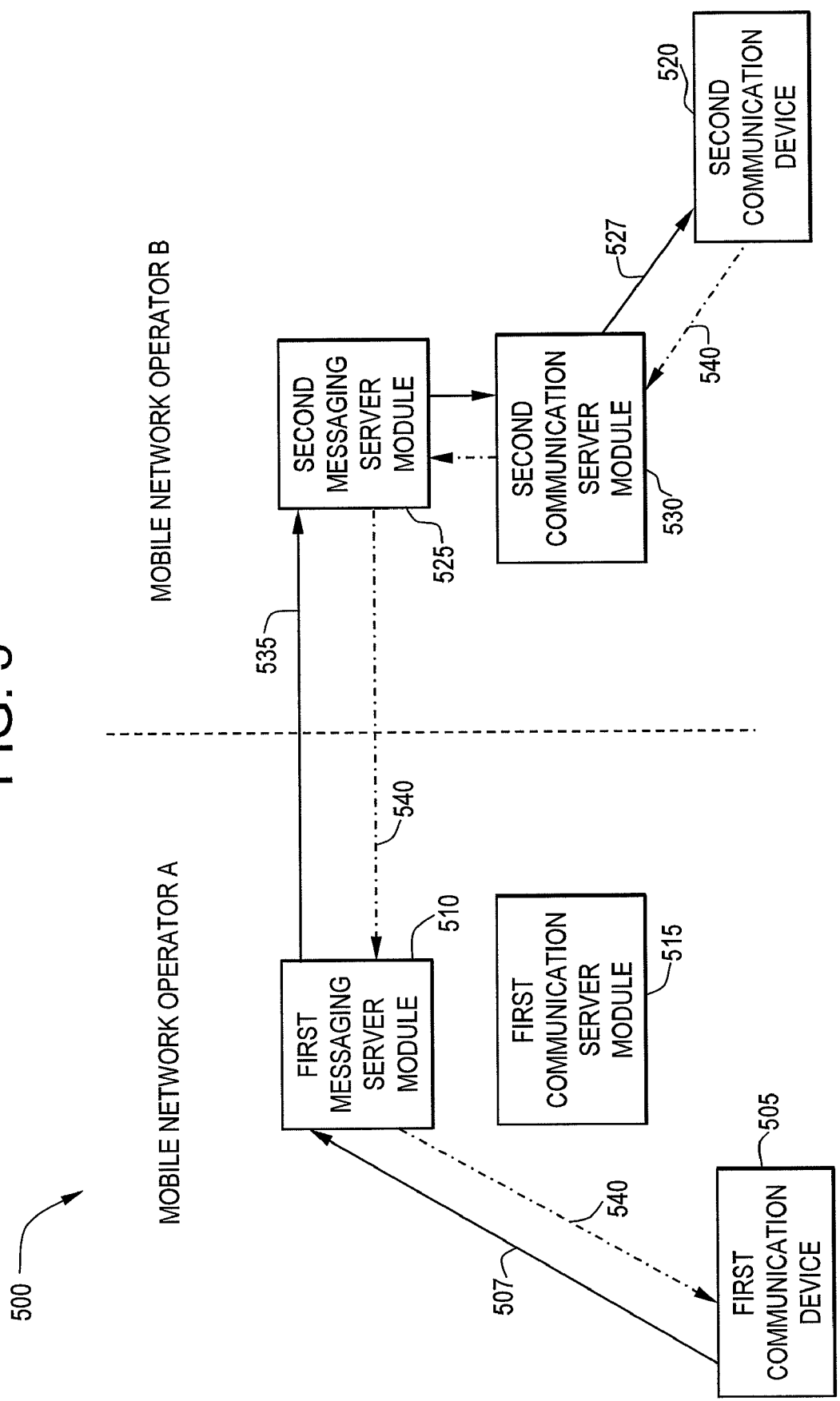
FIG. 5 is a block diagram illustrating a system for communicating information using "smart" addressing, in accordance with an alternative exemplary embodiment of the present invention.

According to an alternative exemplary embodiment of the present invention, routing of messages between users using different messaging services can be based on "smart" addressing, instead of, for example, the MSISDN. Such an alternative exemplary embodiment can be used without the need of the signaling gateway module 215 of the system 200 of FIG. 2 or the messaging interface module 425 of system 400 of FIG. 4. FIG. 5 is a block diagram illustrating a system 500 for communicating information using such "smart" addressing, in accordance with an alternative exemplary embodiment of the present invention. For purposes of illustration and not limitation, the system 500 includes mobile network operators A and B, although any suitable number and kinds of networks can be used with the present exemplary embodiment. A first communication device 505 is operated in the mobile network operator A. The mobile network operator A includes a first messaging server module 510 and a first communication server module 515. The first communication device 505 can be in communication with one or both of the first messaging server module 510 and first communication server module 515, depending on the first messaging service 507 used to communicate information to and from the first communication device 505. For example, according to an exemplary embodiment, the first communication device 505 can comprise an IM client device or the like, the first messaging service 507 can comprise IM or the like, the first messaging server module 510 can comprise an IM Enabler or the like, and the first communication server module 515 can comprise a SMSC or the like. In such an example, the IM client communicates directly with the IM Enabler using IM.

A second communication device 520 is operated in the mobile network operator B. The mobile network operator B includes a second messaging server module 525 and a second communication server module 530. The second communication device 520 can be in communication with one or both of the second messaging server module 525 and second communication server module 530, depending on the second messaging service 527 used to communicate information to and from the second communication device 520. For example, according to an exemplary embodiment, the second communication device 520 can comprise a SMS-Only client device or the like, the second messaging service 527 can comprise SMS or the like, the second messaging server module 525 can comprises an IM Enabler or the like, and the second communication server module 530 can comprises a SMSC or the like. In such an example, the SMS-Only client communicates directly with the SMSC using SMS. For purposes of illustration and not limitation, the solid-line communication path 535 is illustrative of the path taken for initiating a message from first communication device 505 to second communication device 520. The dashed-line communication path 540 is illustrative of the path taken by a reply message from the second communication device 520 to the first communication device 505. However, according to exemplary embodiments, first and second communication devices 505 and 520 can both initiate and reply to message to/from one another.

To support the "smart" addressing according to exemplary embodiments, FIG. 6 illustrates an addressing data structure 600 for use in routing a message from a first user having a first messaging service to a second user having a second messaging service, in accordance with an alternative exemplary embodiment of the present invention. Each of the first and second messaging services can comprise any suitable communication protocol or service. For purposes of illustration and not limitation, the first messaging service can comprise SMS, while the second messaging service can comprise IM, or vice versa.

Figure 6A:
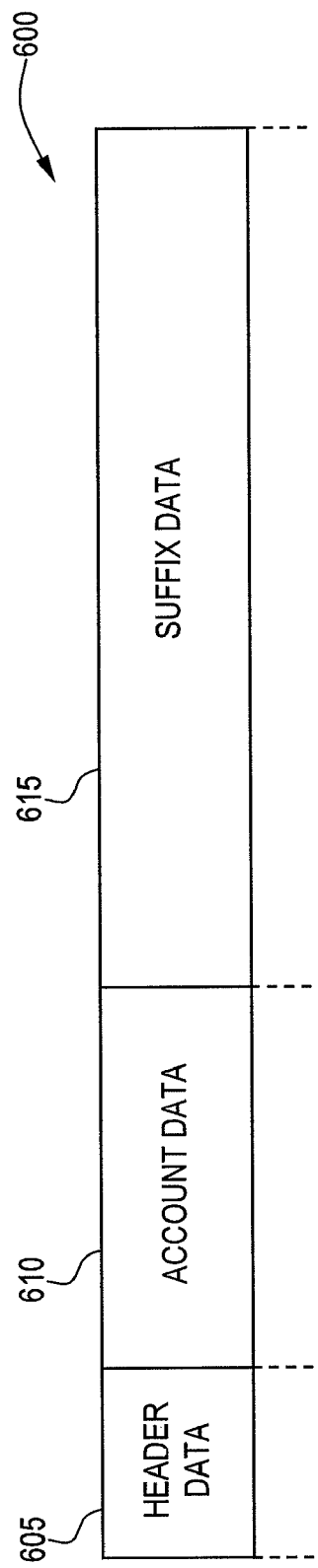
FIG. 6 illustrates an addressing data structure for use in routing a message from a first user having a first messaging service to a second user having a second messaging service, in accordance with an alternative exemplary embodiment of the present invention.
Figure 6B:
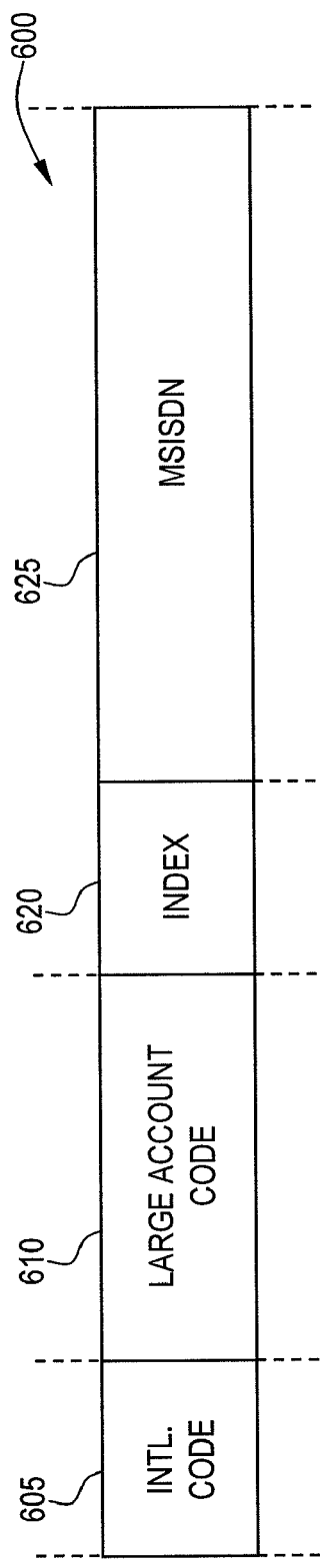

As illustrated in FIG. 6A, the addressing data structure 600 includes a header data structure 605. The addressing data structure 600 includes an account data structure 610. The account data structure 610 comprises an account prefix designation. The addressing data structure 600 further includes a suffix data structure 615. As illustrated in FIG. 6B, the header data structure 605 can comprise an international or country code that is capable of identifying a particular country or other geographical designation of the message recipient. The account prefix designation of the account data structure 610 can comprise a large account code. The large account code is a SMSC-configured address prefix that can be used for routing the message to an application or service. For example, "large accounts" can be systems of service providers, information providers, corporate accounts, or the like. According to an exemplary embodiment, the addressing data structure 600 can be used to route SMS messages. Consequently, the account prefix designation of the account data structure 610 can be configured to cause the SMS message associated with the address data structure 600 to be routed from a SMSC to an IM Enabler.

As illustrated in FIG. 6B, the suffix data structure 615 can comprise an index data structure 620. According to an exemplary embodiment, the index data structure 620 can provide functionality in a manner similar to that provided by a short code. In other words, the index data structure 620 can comprise an index pointer within a reply list for replying to an originator of the message. The suffix data structure 615 can further comprise an address suffix structure 625. The address suffix structure 625 can comprise an address configured to allow the recipient to uniquely determine the originator of the message. For example, the address of the address suffix structure 625 can comprise a MSISDN or other suitable identifier that is capable of uniquely identifying the originator of the message. According to exemplary embodiments, the address data structure 600 is formed in accordance with ITU-T E.164 and E.212 standards.

Figure 6C:
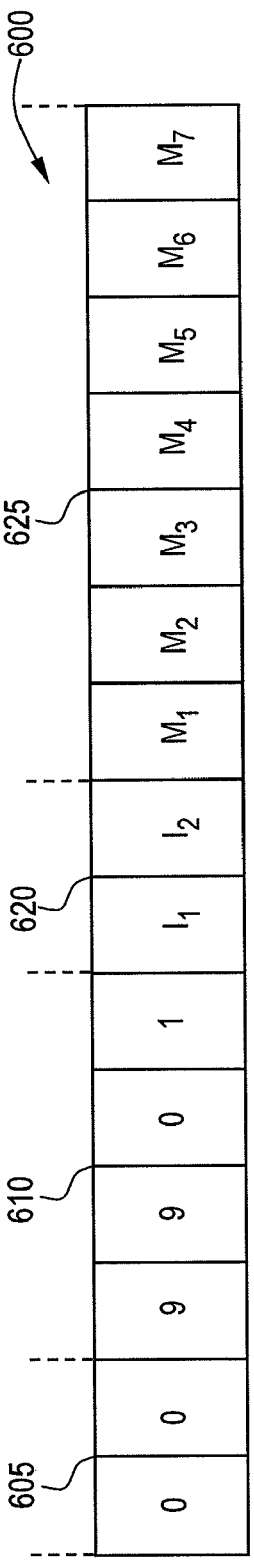

An example of the addressing format for the address data structure 600 is illustrated in FIG. 6C. For purposes of illustration and not limitation, such an example addressing format can be used to communicate a SMS message from the second communication device 520 (e.g., a SMS-Only client) to the first communication device 505 (e.g., an IM client), as illustrated in FIG. 5. In FIG. 6C, the address data structure 600 is fifteen digits in length, although the structure can be of any suitable length. The two digits "00" in the header data structure 605 can represent, for example, the United States. The large account prefix of the account data structure 610 comprises the four digits "9901." The index data structure 620 comprises the two digits "$I_1I_2$." The address suffix structure 625 comprise a MSISDN with the seven digits "$M_1M_2M_3M_4M_5M_6M_7$."

In accordance with the present illustration, the second communication server module 530 (e.g., a SMSC) can be configured to route all SMS messages with 9901*(where "*" is a wildcard) to the first messaging server module 510 (e.g., an IM Enabler). In such a manner, messages from an originator sent using one messaging service can be routed to a recipient that uses a different messaging service, without the use of a signaling gateway module 215 or messaging interface module 425. The index "$I_1I_2$" can allow a per-user unique pointer in the reply list of the recipient to be maintained, in a manner similar to short codes. The MSISDN "$M_1M_2M_3M_4M_5M_6M_7$" can allow the address book of the (e.g., IM) recipient to resolve and show or otherwise display the originator of the message, even though the originator is using a different messaging service (e.g., a SMS-Only client). In addition, the index allows for identification of the message originator from a remote mobile network operator that does not expose the message originator's MSISDN. In such an exemplary embodiment, a dummy, random, or otherwise substitute MSISDN can be used instead. The uniqueness of the identifier (for identifying the message originator) can be maintained by the recipient by using, for example, a combination of the index and the MSISDN of the recipient.

Figure 7:
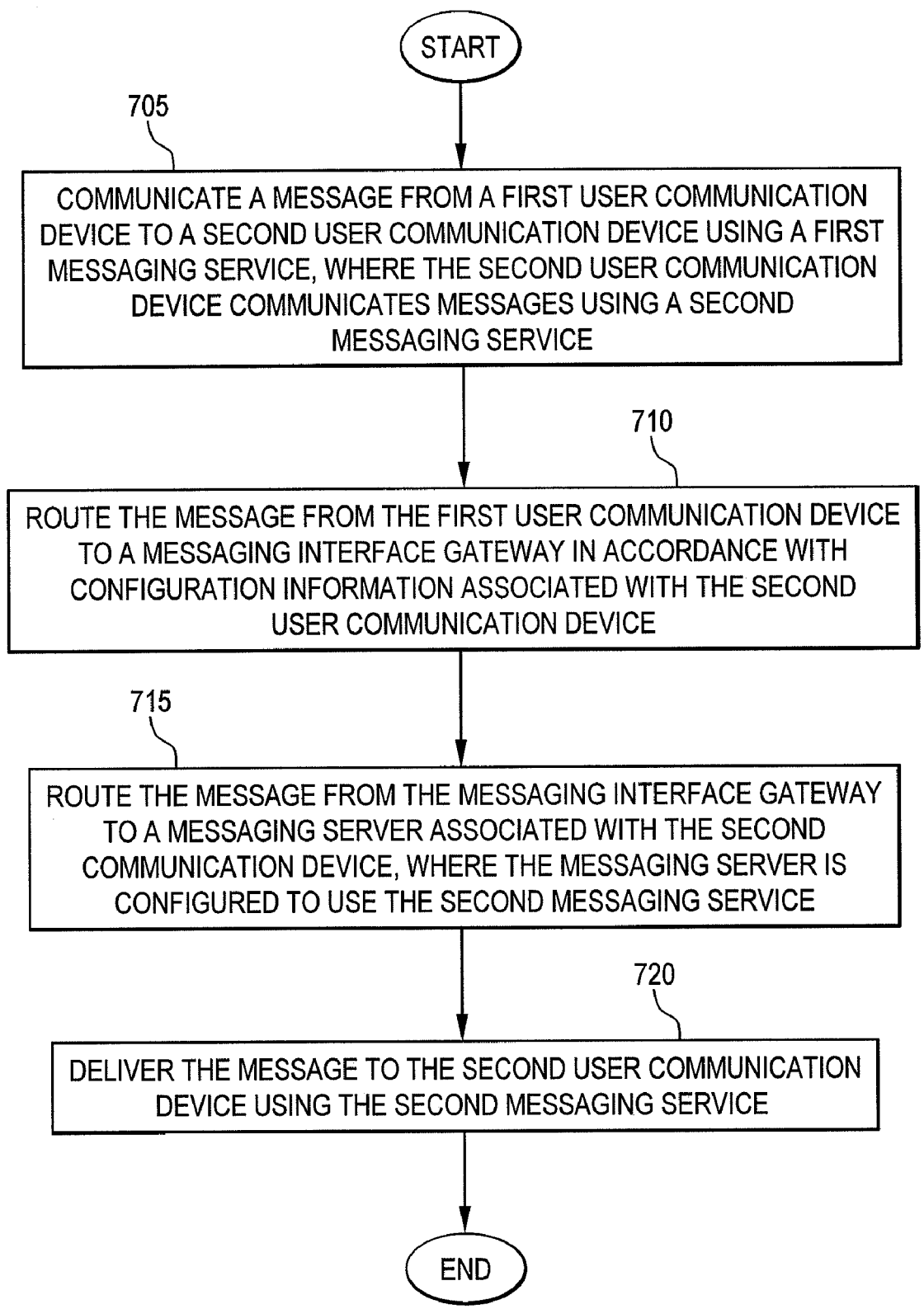
FIG. 7 is a flowchart illustrating steps for communicating messages between users that use different messaging services, in accordance with an exemplary embodiment of the present invention.

FIG. 7 is a flowchart illustrating steps for communicating messages between users that use different messaging services, in accordance with an exemplary embodiment of the present invention. In step 705, a message is communicated from a first user communication device to a second user communication device using a first messaging service. The second user communication device communicates messages using a second messaging service. In step 710, the message from the first user communication device is routed to a messaging interface gateway in accordance with configuration information associated with the second user communication device. In step 715, the message is routed from the messaging interface gateway to a messaging server associated with the second user communication device. The messaging server is configured to use the second messaging service. In step 720, the message is delivered to the second user communication device using the second messaging service.

The method can include the step of storing the configuration information of at least the second user communication device. For example, the configuration information of the second user communication device can comprise a MSISDN or other suitable unique address or identifier. The stored configuration information associated with the second user communication device can be retrieved for routing the message to the messaging interface gateway. Additionally, the stored configuration information of the second user communication device can be modified so that messages between the first user communication device and the second user communication device are routed through the messaging interface gateway.

According to an additional exemplary embodiment, messages routed through the messaging interface gateway that are communicated from the first user communication device using the first messaging service can be suitably filtered. In particular, non-message-related information communicated from the first user communication device using the first messaging service can be blocked. Additionally or alternatively, returning the non-message-related information can be returned or otherwise routed back to the first user communication device. According to such an exemplary embodiment, the returned non-message-related information can be prevented from being routed back to the messaging interface gateway. For example, the first user communication device can be associated with at least two addresses. One of the at least two addresses can be adapted for use in returning the non-message related information to the first user communication device.

According to an exemplary embodiment of the present invention, the first user communication device can comprise a SMS communication device. The messaging server can comprise an IM Enabler. The first messaging service can comprise SMS. The messaging interface gateway can comprise a SS7 application. The second user communication device can comprise an IM communication device. The second messaging service can comprise IM.

Each, all or any combination of the steps of a computer program as illustrated in FIG. 7 for communicating messages between users that use different messaging services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in conjunction with any device, system or process for communicating messages between users that use different messaging services. More particularly, exemplary embodiments of the present invention can be used by SMS clients based on SMSC servers and IM clients using IM Enablers (or other like messaging servers and clients) to seamlessly exchange messages bi-directionally for both initiating and replying to such messages, although the clients are using different messaging services.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and patent applications, foreign patents and patent applications, and publications discussed above are hereby incorporated by reference herein in their entireties to the same extent as if each individual patent, patent application, or publication was specifically and individually indicated to be incorporated by reference in its entirety.

What is claimed is:

1. A system for communicating information between users that use different messaging services, comprising:
    a first user communication module,
        wherein the first user communication module is configured to communicate a message to a second user communication module using a first messaging service, and
        wherein the second user communication module is configured to communicate messages using a second messaging service; and
    a signaling gateway module in communication with the first user communication module,
        wherein the signaling gateway module is configured to interface messages between the first messaging service and the second messaging service,
        wherein the message from the first user communication module is routed to the signaling gateway module in accordance with configuration information associated with the second user communication module, and
        wherein the signaling gateway module is configured to route the message to the second user communication module via a messaging server module configured to use the second messaging service, and
        wherein the signaling gateway module comprises:
    a message filter module,
        wherein the message filter module is configured to allow routing through the signaling gateway module of messages communicated from the first user communication module using the first messaging service, and
        wherein the message filter module is further configured to block non-message-related information communicated from the first user communication module using the first messaging service.

2. The system of claim 1, comprising:
    a communication server module in communication between the first user communication module and the signaling gateway module,
        wherein the communication server module is configured to communicate with the first user communication module using the first messaging service.

3. The system of claim 2, wherein the communication server module comprises a Short Message Service Center (SMSC) module.

4. The system of claim 2, comprising:
    a user information database module in communication with the communication server module,
        wherein the user information database module is configured to store the configuration information of the first and second user communication modules.

5. The system of claim 4, wherein the configuration information of the second user communication module comprises a Mobile Station International Subscriber Directory Number (MSISDN).

6. The system of claim 4, wherein the communication server module is configured to obtain the configuration information associated with the second user communication module from the user information database module for routing the message to the signaling gateway module.

7. The system of claim 4, wherein the signaling gateway module is configured to modify the configuration information of the second user communication module stored in the user information database module so that messages between the first user communication module and the second user communication module are routed through the signaling gateway module.

8. The system of claim 4, wherein the user information database module comprises a Home Location Register (HLR) module.

9. The system of claim 1, wherein the message filter module is configured to return the non-message-related information to the first user communication module.

10. The system of claim 9, comprising:
    a user information database proxy module,
        wherein the user information database proxy module is configured to prevent the returned non-message-related information from being routed back to the signaling gateway module.

11. The system of claim 10, wherein the user information database proxy module comprises a Home Location Register (HLR) proxy module.

12. The system of claim 9, wherein the first user communication module is associated with at least two addresses, and
    wherein one of the at least two addresses is adapted for use in returning the non-message related information to the first user communication module.

13. The system of claim 1, wherein the first user communication module comprises a Short Message Service (SMS) communication device.

14. The system of claim 1, wherein the signaling gateway module comprises a Signaling System 7 (SS7) application module.

15. The system of claim 1, wherein the second user communication module comprises an Instant Messaging (IM) communication device.

16. The system of claim 1, wherein the messaging server module comprises an Instant Messaging (IM) enabler module.

17. The system of claim 1, wherein the first messaging service comprises Short Message Service (SMS).

18. The system of claim 1, wherein the second messaging service comprises Instant Messaging (IM).

19. A method of communicating messages between users that use different messaging services, comprising the steps of:
    a.) communicating a message from a first user communication device to a second user communication device using a first messaging service,
        wherein the second user communication device communicates messages using a second messaging service;
    b.) routing the message from the first user communication device to a messaging interface gateway in accordance with configuration information associated with the second user communication device;
    c.) routing the message from the messaging interface gateway to a messaging server associated with the second user communication device,
        wherein the messaging server is configured to use the second messaging service;
    d.) delivering the message to the second user communication device using the second messaging service;

e.) filtering messages routed through the messaging interface gateway that are communicated from the first user communication device using the first messaging service; and f.) blocking non-message-related information communicated from the first user communication device using the first messaging service.

20. The method of claim 19, further comprising the step of:

g.) storing the configuration information of at least the second user communication device.

21. The method of claim 20, wherein the configuration information of the second user communication device comprises a Mobile Station International Subscriber Directory Number (MSISDN).

22. The method of claim 20, further comprising the step of:

h.) retrieving the stored configuration information associated with the second user communication device for routing the message to the messaging interface gateway.

23. The method of claim 20, further comprising the step of:

h.) modifying the stored configuration information of the second user communication device so that messages between the first user communication device and the second user communication device are routed through the messaging interface gateway.

24. The method of claim 19, further comprising the step of:

g.) returning the non-message-related information to the first user communication device.

25. The method of claim 24, comprising the step of:

h.) preventing the returned non-message-related information from being routed back to the messaging interface gateway.

26. The method of claim 24, wherein the first user communication device is associated with at least two addresses, and wherein one of the at least two addresses is adapted for use in returning the non-message related information to the first user communication device.

27. The method of claim 19, wherein the first user communication device comprises a Short Message Service (SMS) communication device.

28. The method of claim 19, wherein the messaging interface gateway comprises a Signaling System 7 (SS7) application.

29. The method of claim 19, wherein the second user communication device comprises an Instant Messaging (IM) communication device.

30. The method of claim 19, wherein the messaging server comprises an Instant Messaging (IM) enabler.

31. The method of claim 19, wherein the first messaging service comprises Short Message Service (SMS).

32. The method of claim 19, wherein the second messaging service comprises Instant Messaging (IM).

33. A system for communicating information between users, comprising:

a first mobile network operator in communication with a first communication device, wherein the first communication device is configured to communicate a message to a second communication device using a first messaging service, and wherein the second communication device is configured to communicate messages using a second messaging service; and a second mobile network operator in communication with the first mobile network operator and the second communication device, wherein the second mobile network operator comprises:

a messaging interface module, wherein the messaging interface module is configured to interface messages between the first messaging service and the second messaging service; and a messaging server module in communication with the messaging interface module and the second communication device, wherein the messaging server module is configured to use the second messaging service for communicating messages to the second communication device, wherein the first mobile network operator is configured to route the message from the first communication device to the messaging interface module in accordance with address information associated with the second communication device, wherein the messaging interface module is configured to route the message to the messaging server module, and wherein the messaging server module is configured to deliver the message to the second communication device using the second messaging service, and wherein the messaging server module is further configured to block non-message-related information communicated from the first communication device using the first messaging service.

* * * * *